United States Patent
Raab

(10) Patent No.: US 8,457,682 B2
(45) Date of Patent: *Jun. 4, 2013

(54) METHOD AND SYSTEM FOR INTEGRATED SATELLITE ASSISTANCE SERVICES

(75) Inventor: Stefan Bernard Raab, South Riding, VA (US)

(73) Assignee: DBSD Satellite Services G.P., Reston, VA (US)

( * ) Notice: Subject to any disclaimer, the term of this patent is extended or adjusted under 35 U.S.C. 154(b) by 1286 days.

This patent is subject to a terminal disclaimer.

(21) Appl. No.: 12/042,204

(22) Filed: Mar. 4, 2008

(65) Prior Publication Data

US 2009/0227280 A1   Sep. 10, 2009

(51) Int. Cl.
  *H04M 1/00* (2006.01)
  *H04B 1/38* (2006.01)
  *H04W 4/00* (2009.01)
  *H04L 12/28* (2006.01)
  *H04L 12/66* (2006.01)
  *G06F 7/00* (2006.01)
  *G06F 17/00* (2006.01)

(52) U.S. Cl.
  USPC ........ 455/550.1; 455/566; 455/430; 455/563; 370/390; 701/36; 701/45

(58) Field of Classification Search
  USPC .. 455/550.1, 566, 430, 563; 370/390; 701/36, 701/45
  See application file for complete search history.

(56) References Cited

U.S. PATENT DOCUMENTS

| | | | |
|---|---|---|---|
| 4,992,947 A | 2/1991 | Nimura et al. | |
| 5,394,561 A | 2/1995 | Freeburg | |
| 5,758,261 A | 5/1998 | Wiedeman | |
| 6,212,473 B1 | 4/2001 | Stefan et al. | |
| 6,269,304 B1 | 7/2001 | Kaji et al. | |
| 6,360,167 B1 | 3/2002 | Millington et al. | |
| 6,405,129 B1 | 6/2002 | Yokota | |
| 6,484,094 B1 | 11/2002 | Wako | |
| 6,487,496 B2 | 11/2002 | Katayama et al. | |
| 6,505,118 B2 | 1/2003 | Chowanic et al. | |
| 6,522,865 B1 | 2/2003 | Otten | |
| 6,711,474 B1 | 3/2004 | Treyz et al. | |
| 6,714,760 B2 | 3/2004 | Robinett | |
| 6,714,860 B1 | 3/2004 | Wawra et al. | |

(Continued)

OTHER PUBLICATIONS

International Search Report and Written Opinion for PCT/US09/35846, mailed on Apr. 28, 2009; 7 pages.

(Continued)

*Primary Examiner* — Bobbak Safaipour
(74) *Attorney, Agent, or Firm* — Dorsey & Whitney LLP

(57) ABSTRACT

A method and an apparatus according to an embodiment of the invention includes a controller to process a travel assistance request for communication through a satellite and terrestrial mobile communication network. Data related to multiple assistance providers can be received in response to the request. At least one criterion can be processed for the assistance providers based on, for example, historical trip data. The assistance providers can be graphically represented for user selection based on the criterion. Data related to a selected assistance provider can be displayed, including navigation data to and/or from the assistance provider. In another embodiment, the travel assistance request can be communicated to a service center through the network. The service center can communicate data related to an assistance provider, including navigation data to and/or from the assistance provider. A rating of the assistance provider can be communicated to a specified community-of-interest through the network.

6 Claims, 17 Drawing Sheets

U.S. PATENT DOCUMENTS

| | | | |
|---|---|---|---|
| 6,771,742 B2 | 8/2004 | McCalmont et al. | |
| 6,816,778 B2 | 11/2004 | Diaz | |
| 6,865,149 B1* | 3/2005 | Kalman et al. | 370/225 |
| 6,941,222 B2 | 9/2005 | Yano et al. | |
| 6,950,625 B2 | 9/2005 | Regulinski et al. | |
| 6,961,658 B2 | 11/2005 | Ohler | |
| 6,992,991 B2 | 1/2006 | Duske, Jr. et al. | |
| 6,999,720 B2 | 2/2006 | Karabinis | |
| 7,013,205 B1* | 3/2006 | Hafner et al. | 701/22 |
| 7,017,175 B2 | 3/2006 | Alao et al. | |
| 7,031,702 B2 | 4/2006 | Karabinis et al. | |
| 7,071,842 B1 | 7/2006 | Brady, Jr. | |
| 7,082,365 B2 | 7/2006 | Sheha et al. | |
| 7,092,818 B2 | 8/2006 | Ohler | |
| 7,136,661 B2 | 11/2006 | Graske et al. | |
| 7,164,661 B2 | 1/2007 | Kelly | |
| 7,176,813 B2 | 2/2007 | Kawamata et al. | |
| 7,197,394 B2 | 3/2007 | Ohler | |
| 7,224,935 B2 | 5/2007 | Messina et al. | |
| 7,233,860 B2 | 6/2007 | Lokshin et al. | |
| 7,239,963 B2 | 7/2007 | Suzuki | |
| 7,242,948 B2 | 7/2007 | Fleischer et al. | |
| 7,269,503 B2 | 9/2007 | McGrath | |
| 7,271,742 B2 | 9/2007 | Sheha et al. | |
| 7,274,905 B1 | 9/2007 | Nguyen et al. | |
| 7,274,906 B1 | 9/2007 | Nguyen et al. | |
| 7,286,931 B2 | 10/2007 | Kawasaki | |
| 7,412,313 B2 | 8/2008 | Isaac | |
| 7,469,184 B2* | 12/2008 | Isaac | 701/409 |
| 7,599,770 B2* | 10/2009 | Hardy | 701/521 |
| 7,908,076 B2 | 3/2011 | Downs et al. | |
| 2002/0065037 A1 | 5/2002 | Messina et al. | |
| 2002/0065078 A1 | 5/2002 | Cohen et al. | |
| 2004/0204820 A1 | 10/2004 | Diaz | |
| 2005/0096971 A1* | 5/2005 | Baechtiger | 705/11 |
| 2005/0137788 A1 | 6/2005 | Kimura | |
| 2005/0149250 A1 | 7/2005 | Isaac | |
| 2006/0022048 A1 | 2/2006 | Johnson | |
| 2006/0178807 A1 | 8/2006 | Kato et al. | |
| 2006/0217885 A1 | 9/2006 | Crady et al. | |
| 2006/0229807 A1* | 10/2006 | Sheha et al. | 701/209 |
| 2006/0229810 A1 | 10/2006 | Cross et al. | |
| 2006/0247845 A1 | 11/2006 | Cera et al. | |
| 2006/0253246 A1 | 11/2006 | Cera et al. | |
| 2007/0087690 A1 | 4/2007 | Karabinis | |
| 2007/0150174 A1 | 6/2007 | Seymour et al. | |
| 2007/0182592 A1 | 8/2007 | Lekovic | |
| 2007/0225910 A1 | 9/2007 | Fujiwara | |
| 2007/0298813 A1 | 12/2007 | Singh et al. | |
| 2007/0299599 A1 | 12/2007 | Letchner et al. | |
| 2008/0009239 A1 | 1/2008 | Nguyen et al. | |
| 2008/0009240 A1 | 1/2008 | Nguyen et al. | |
| 2008/0033639 A1 | 2/2008 | Nakamura et al. | |
| 2008/0094250 A1 | 4/2008 | Myr | |
| 2008/0125958 A1* | 5/2008 | Boss et al. | 701/123 |
| 2008/0228562 A1* | 9/2008 | Smith et al. | 705/13 |
| 2008/0268838 A1* | 10/2008 | Zufall et al. | 455/430 |
| 2008/0319642 A1* | 12/2008 | DeBie | 701/201 |
| 2009/0228196 A1* | 9/2009 | Raab | 701/200 |
| 2011/0202266 A1 | 8/2011 | Downs et al. | |
| 2013/0012238 A1 | 1/2013 | Raab | |
| 2013/0013193 A1 | 1/2013 | Raab | |

OTHER PUBLICATIONS

International Search Report and Written Opinion for PCT/US09/35845, mailed on Nov. 9, 2009; 10 pages.

Office Action mailed Dec. 21, 2010 for U.S. Appl. No. 12/042,207, filed Mar. 4, 2008.

Office Action mailed Oct. 13, 2011 for U.S. Appl. No. 12/042,207, filed Mar. 4, 2008.

Office Action mailed Jun. 13, 2011 for U.S. Appl. No. 12/042,207, filed Mar. 4, 2008.

Amendment and Response to Office Action dated Mar. 25, 2011, U.S. Appl. No. 12/042,207, 14 pages.

Amendment and Response to Final Office Action dated Sep. 12, 2011, 15 pages.

Amendment and Response to Office Action dated Jan. 13, 2012, 5 pages.

Office Action dated Feb. 27, 2012, U.S. Appl. No. 12/042,207, 7 pages.

Amendment and Response to Office Action and Terminal Disclaimer dated May 23, 2012, U.S. Appl. No. 12/042,207, 6 pages.

Final Office Action dated Jun. 5, 2012, U.S. Appl. No. 12/042,207, 9 pages.

Amendment and Response to Final Office Action and Terminal Disclaimer dated Jul. 17, 2012, U.S. Appl. No. 12/042,207, 6 pages.

Notice of Allowance and Fee(s) Due dated Aug. 3, 2012, U.S. Appl. No. 12/042,207, 10 pages.

Preliminary Amendment dated Nov. 5, 2012, U.S. Appl. No. 13/619,938, 8 pages.

Office Action dated Dec. 28, 2012, U.S. Appl. No. 13/619,938, 8 pages.

U.S. Appl. No. 13/619,848.

Preliminary Amendment dated Nov. 5, 2012, U.S. Appl. No. 13/619,848, 8 pages.

U.S. Appl. No. 12/042,207.

Office Action dated Jan. 7, 2013, U.S. Appl. No. 12/042,207, 9 pages.

Amendment and Response to Office Action and Terminal Disclaimer dated Mar. 26, 2013, U.S. Appl. No. 13/619,938, 12 pages.

Response to Office Action and Terminal Disclaimers (2) dated Mar. 31, 2013, U.S. Appl. No. 12/042,207, 7 pages.

* cited by examiner

METHOD AND SYSTEM FOR INTEGRATED SATELLITE ASSISTANCE SERVICES

CROSS-REFERENCE TO RELATED APPLICATIONS

This application is related to U.S. patent application entitled "Method and System for Using Routine Driving Information In Mobile Interactive Satellite Services", filed concurrently herewith, Ser. No. 12/042,207. The above-identified U.S. patent application is hereby incorporated herein by reference in its entirety.

BACKGROUND

The invention relates generally to travel assistance and more particularly to devices providing interactive travel assistance services and methods for using such devices.

A hybrid satellite and terrestrial communication system, such as a Mobile Satellite Services (MSS) system with an Ancillary Terrestrial Component (ATC), for example, can provide a more efficient spectrum utilization and a more effective coverage in rural and urban areas than can be provided by stand-alone mobile satellite systems. For that reason, existing MSS/ATC systems have been typically used to provide voice communication with wide geographic coverage. Using existing MSS/ATC systems to make available other types of services, however, poses many implementation challenges. For instance, to support mobile interactive services, an MSS/ATC system design may need to effectively handle multicast transmissions across both satellite networks and ancillary terrestrial networks along with interactive communications with individual users. When properly designed, an MSS/ATC system can support one or more mobile interactive services, including travel assistance services, for example.

In a typical travel or roadside assistant service, a request is made from a vehicle to a service center through a cellular network. The service center can dispatch, automatically and/or through a live operator, for example, a service vehicle to where the person making the request is located. These types of services are limited, however, since user preferences are not generally part of the criteria used in the service center's selection of the service provider. For example, the service center may dispatch a service provider because it is the closest one to the requester, but it is one with whom the requester has had a bad experience in the past. In many instances restrictions in the scope of travel assistant services provided can result from the system and/or the network supporting those services.

Thus, a need exists for interactive services and/or devices that use satellite and terrestrial communication systems to offer users a wide geographic coverage along with a more flexible, effective, and/or feature-rich travel assistance experience.

SUMMARY

An apparatus may include a controller to process a travel assistance request for communication through a satellite and terrestrial mobile communication network. Data related to multiple assistance providers can be received in response to the request. At least one criterion can be processed for the service assistance based on, for example, historical trip data. The assistance providers can be graphically represented for user selection based on the criterion. Data related to a selected assistance provider can be displayed, including navigation data to and/or from the assistance provider. In another embodiment, the travel assistance request can be communicated to a service center through the network. The service center can communicate data related to an assistance provider, including navigation data between the assistance provider and the user making the request. A rating of the assistance provider can be communicated to a specified community-of-interest through the network.

DETAILED DESCRIPTION

Figure 1:
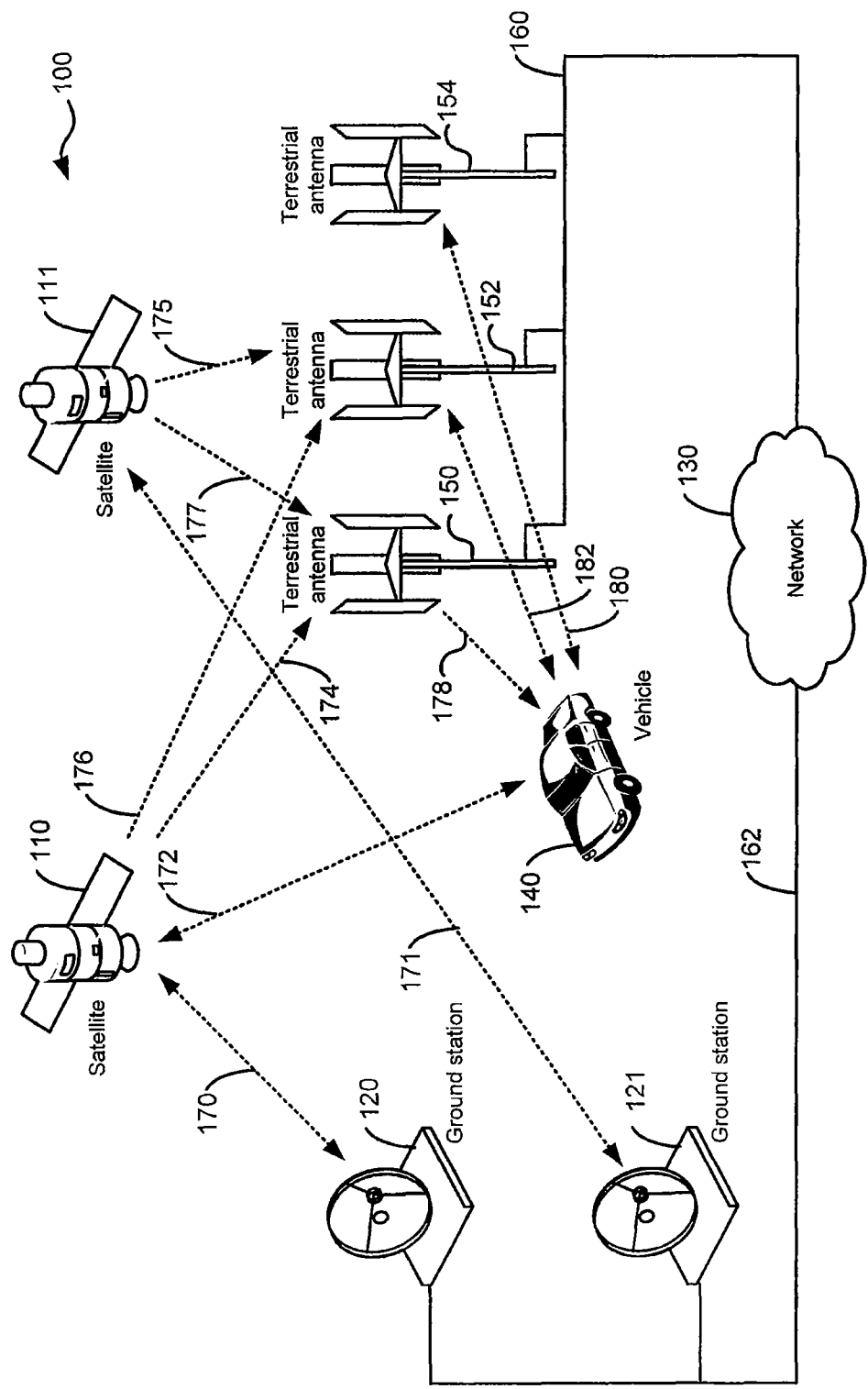
FIG. 1 is a schematic representation of a satellite and terrestrial mobile communication network, according to an embodiment of the invention.

The devices and methods described herein are generally related to mobile or in-vehicle interactive navigation services. For example, the devices and methods are suitable for use in a hybrid satellite and terrestrial (satellite/terrestrial) communication system, such as a Mobile Satellite Services (MSS) system with an Ancillary Terrestrial Component (ATC). An example of such a hybrid satellite/terrestrial communication system is described in U.S. patent application Ser. No. 11/797,048 to Zufall et, al., the disclosure of which is incorporated herein by reference in its entirety. An MSS MSS/ATC system can use one or more satellites to support a wide geographic coverage of mobile satellite interactive services. For example, a portion of the 2 GHz spectrum allocated for MSS satellite communications can be used to provide effective service coverage to rural and remote areas. Along with the MSS network, the land-based ATC network can facilitate service penetration in urban and suburban areas through effective satellite and terrestrial frequency reuse.

The mobile interactive satellite services described herein can be used to provide interactive travel assistance services. A user can request travel assistance (e.g., vehicle repair assistance, medical care assistance, travel guidance assistance) through a mobile interactive services system. In one embodiment, data related to multiple assistance service providers (e.g., gas stations, auto repair shops, police stations, medical centers, clinics, hospitals) for a specified assistance category (e.g., auto repair providers, medical care providers, public safety providers) can be received in response to the request via a hybrid satellite/terrestrial communication network. At least one criterion can be processed for the assistance providers based on, for example, historical trip data. In some instances, data related to each of the assistance providers can be graphically represented based on the criterion to assist the user in the selection process. Navigation data and/or other information to and/or from the selected assistance provider can be displayed to assist the user getting appropriate assistance.

In another embodiment, the travel assistance request can be communicated to a service center through the hybrid satellite/ terrestrial communication network. The service center can communicate data related to a specified assistance provider, including navigation data to and/or from the assistance provider and/or information related to a service vehicle dispatched by the assistance provider. In some instances, the user can provide ratings and/or reviews of the assistance provider that can be shared with a specified community-of-interest (COI) through the hybrid satellite/terrestrial communication network.

It is noted that, as used in this written description and the appended claims, the singular forms "a," "an" and "the" include plural referents unless the context clearly dictates otherwise. Thus, for example, the term "a route segment" is intended to mean a single segment or a combination of segments. Similarly, the term "a destination area" is intended to mean, for example, a single destination area or more than one destination areas.

FIG. 1 depicts a schematic representation of a satellite and terrestrial mobile communication network, according to an embodiment of the invention. A hybrid satellite/terrestrial communication network 100 can be configured to provide mobile interactive satellite services, such as interactive travel assistance services, for example. The hybrid satellite/terrestrial communication network 100 can include a first satellite 110, terrestrial antennas 150, 152, and/or 154, a first ground station 120, and a network 130. In some instances, the hybrid satellite/terrestrial communication network 100 can have a second satellite 111 and/or a second ground station 121 to support other mobile interactive satellite services, such as mobile video services that provide satellite television multicasting, for example.

The first satellite 110 can be configured to communicate with the first ground station 120 through one or more signals in a connection or communication path 170 that includes, for example, uplink signals and downlink signals. The uplink signals can be used to communicate information or data from the first ground station 120 to the first satellite 110. The uplink-communicated information can include a multicast portion or component (e.g., video, music, traffic reports, radio) and/or an interactive component (e.g., navigation data, travel assistance data). The downlink signals can be used to communicate data, such as interactive data (e.g., requests for navigation services, requests for travel assistance services), from the first satellite 110 to the first ground station 120.

The first ground station 120 can be configured to process at least a portion of the data or information related to an interactive service that can be supported by the hybrid satellite/ terrestrial communication network 100. In this regard, the first ground station 120 can be configured to process multicast, interactive, and/or control data for communication with the first satellite 110. In one example, the first ground station 120 can generate ground-based beam-forming (GBBF) information that is communicated to the first satellite 110 via the communication path 170. The GBBF information can be used to configure a transmission antenna, such as an antenna array, for example, which can be used by the first satellite 110 to generate an appropriate number of beam spots and beam spot locations, and/or appropriate beam spot shapes to effectively communicate with a mobile interactive services system, such as one that can be used in the vehicle 140, and/or with terrestrial antennas 150 and 152. The GBBF information can be dynamically modified to adjust communication operations, including spectrum bandwidth and/or geographic coverage, for example, between the first satellite 110 and users of mobile interactive satellite services. In emergency situations, such as during a natural disaster, for example, GBBF information can be processed in a manner such that priority in spectrum bandwidth and/or geographic coverage can be given to affected areas.

The first satellite 110 can be configured to communicate with a mobile interactive services system through one or more signals in a connection or communication path 172. In the example shown in FIG. 1, the first satellite 110 can communicate with a mobile interactive services system in the vehicle 140. The communication path 172 can include a downlink signals through which the first satellite 110 can wirelessly transmit multicast and/or interactive data to the mobile interactive services system and an uplink signals to wirelessly transmit interactive data from the mobile interactive services system in the vehicle 140 to the first satellite 110. In this regard, a user can request data, such as travel assistance data, data related to a specific destination, and/or data related to a destination or assistance category of interest, for example, through one or more mobile interactive satellite services supported though the uplink signals in the communication path 172. Moreover, a mobile interactive services system can communicate with a service provider (e.g., navigation service provider, travel assistance service provider, a travel assistance service center) through the downlink and uplink signals in the communication path 172.

In some embodiments, the first satellite 110 can be configured to communicate with terrestrial antennas 150 and 152 using one or more signals through communication paths 174 and 176, respectively. For instance, communication paths 174 and 176 can each include a downlink path from the first satellite 110 to the terrestrial antennas 150 and 152, respectively. Each of the downlink paths can support multicast and/ or interactive data communication to the terrestrial antenna.

In one example, the terrestrial antenna 150 can be configured to further communicate multicast and/or interactive data received from the first satellite 110 to a mobile interactive services system in the vehicle 140 through a downlink path in a communication path 178. In the example shown in FIG. 1, however, terrestrial antenna 150 may not be configured to receive interactive data from the mobile interactive services system in the vehicle 140 (e.g., communication path 178 may not support uplink signals to terrestrial antenna 150). In another example, terrestrial antenna 152 can be configured to further communicate multicast and/or interactive data received from the first satellite 110 to a mobile interactive services system in the vehicle 140 through a downlink path in a communication path 182. Along with the downlink path, communication path 182 can have an uplink path that can support transmission of signals that include interactive data from the mobile interactive services system in the vehicle 140 to the terrestrial antenna 152.

The ground station 120 can be configured to communicate with terrestrial antennas 150, 152, and 154 through a network 130. In this regard, land-based communication of multicast and/or interactive data can occur through terrestrial antennas 150, 152, and 154. In the example shown in FIG. 1, terrestrial antennas 150, 152, and 154 can be configured to communicate multicast and/or interactive data via at least one of communication paths 178, 182, and 180, respectively, with a mobile interactive services system in the vehicle 140. Terrestrial antennas 152 and 154, for example, can be configured for bi-directional communication and can receive interactive data from the mobile interactive services system in the vehicle 140 through uplink paths in communication paths 182 and 180, respectively. Terrestrial antennas 152 and 154 can be configured to communicate interactive data received from the mobile interactive services system in the vehicle 140 to the ground station 120 through the network 130 for processing.

The network 130 can include at least a portion of, for example, a public switched telephone network (PSTN), a packet-switched network, a satellite network, and/or a wireless network. The packet-switched network can be a multi-protocol label switching (MPLS) network that can carry different kinds of traffic such as Internet protocol (IP) packets, asynchronous transfer mode (ATM) frames, synchronous optical network (SONET) frames, and/or Ethernet frames, for example. The ground station 120 can be configured to communicate with the network 130 through a network connection or communication path 162. Terrestrial antennas 150, 152, and 154 can communicate with the network 130 through a network connection or communication path 160. Communication paths 160 and 162 can include, in some instances, a broadband and/or long-haul optical fiber connection.

Other embodiments of the hybrid satellite/terrestrial communication network 100 can include a number of ground stations, terrestrial antennas, and/or satellites that can be different from those of the different embodiments described in FIG. 1. Moreover, other embodiments of the hybrid satellite/terrestrial communication network 100 can support multiple devices that like the mobile interactive services system in the vehicle 140 can be configured to communicate with the first satellite 110 and with the terrestrial antennas 150, 152, and/or 154. For example, handheld devices, laptops, and/or in-vehicle systems can be configured to receive and/or transmit data related to mobile interactive satellite services through an embodiment of the hybrid satellite/terrestrial communication network 100.

Figure 2:
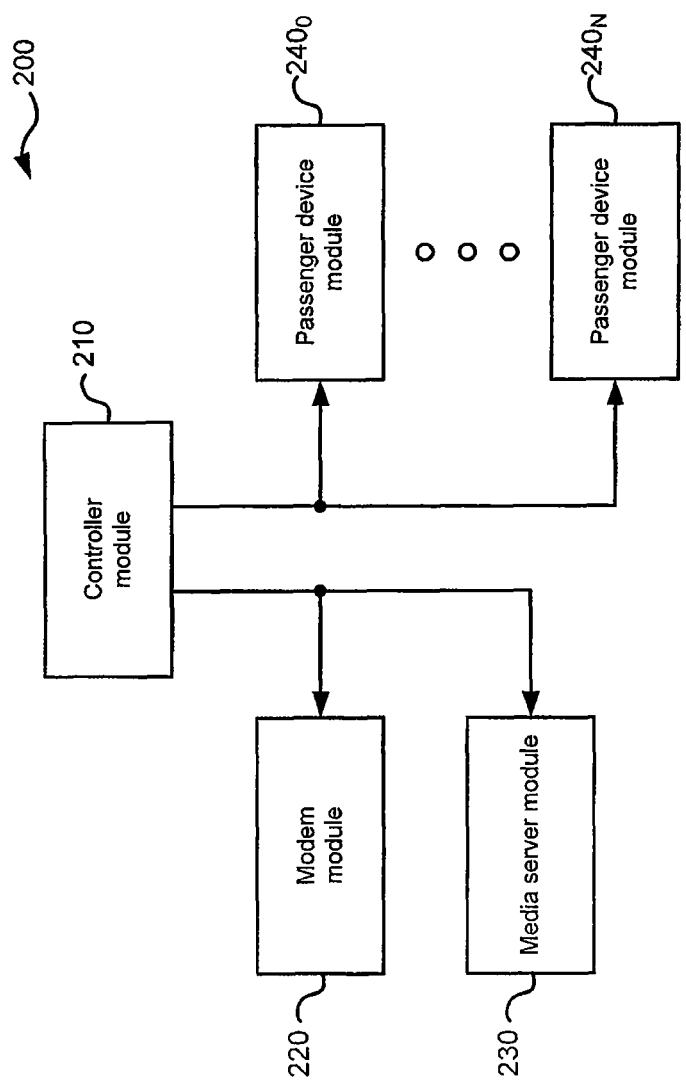
FIGS. 2-3 are block diagrams of a mobile interactive services system for satellite and terrestrial communication, according to embodiments of the invention.
Figure 3:
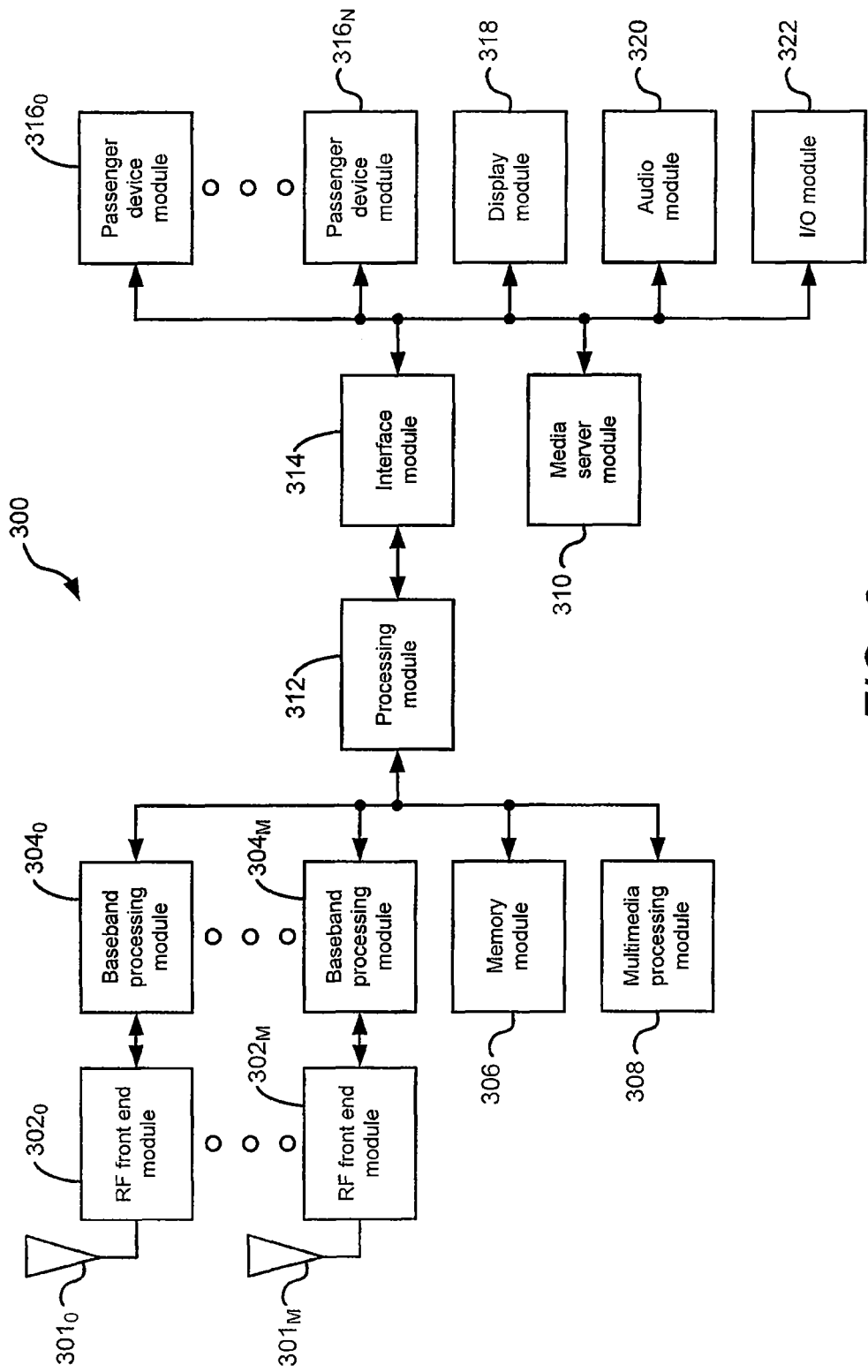

FIGS. 2-3 are block diagrams of a mobile interactive services system for satellite and terrestrial communication, according to embodiments of the invention. FIG. 2 depicts a schematic representation of an mobile interactive services system 200 that can be configured to provide mobile interactive satellite services. In some instances, the mobile interactive services system 200 can be an in-vehicle system (i.e., can operate within and/or coupled to a vehicle, for example). The mobile interactive services system 200 can include a controller module 210, a modem module 220, and/or a media server module 230. In some instances, the mobile interactive services system 200 can include one or more passenger device modules $240_0, \ldots, 240_N$. The controller module 210, the modem module 220, the media server module 230, and the passenger device modules $240_0, \ldots, 240_N$ can be software-based (e.g., set of instructions executable at a processor, software code) and/or hardware-based (e.g., circuit system, processor, application-specific integrated circuit (ASIC), field programmable gate array (FPGA)). In some embodiments, the mobile interactive services system 200 can be configured to communicate with a vehicle communication network, such as, for example, a controller area network (CAN), an on-board diagnostics II (OBD-II), a media-oriented system transport (MOST), or other like vehicle communication networks.

The controller module 210 can be configured to process and/or display data such as data received from other modules or components of the mobile interactive services system 200, data that is provided as input from a user, and/or data received from a vehicle communication network or bus. For instance, the controller module 210 can receive, process, and/or display multicast and/or interactive data that is received via the modem module 220. In some instances, the controller module 210 can receive, process, and/or display data (e.g., video, audio, navigation, and/or travel assistance data) stored in the media server module 230. The data processing provided by the controller module 210 can include processing that supports mobile interactive satellite services such as mobile interactive travel assistance services, for example. The controller module 210 can be configured to store data before, during, and/or after processing.

In some embodiments, the controller module 210 can be configured to collect and/or process historical trip data from one or more previous trips. In other embodiments, the controller module 210 can process historical trip data for transmission to a service provider or service center that may further process the historical trip data to generate, for example, navigation and/or travel assistance data. The travel assistance data generated from the processed historical trip data can be subsequently received by the mobile interactive services system 200. Historical trip data can include, for example, departure time and/or location, arrival time and/or location, road or route segments traveled, travel time, travel distance, time of departure, and/or date (day, week, month, and/or year) of travel. In some embodiments, historical trip data can include navigation data or guidance data that may have been received from a navigation service provider for consideration by a user during a previously occurring trip.

An example of historical trip data processing can include determining which trips are routine or regularly occurring trips. In one embodiment, routinely occurring trips can be determined by generating statistical information which may be compared to specified thresholds to determine when a certain trip (e.g., weekday morning commute to work) occurs routinely. A road or route segment traveled during a routine trip can be referred to as a routine route segment and a destination location or destination area arrived to during a routine trip can be referred to as a routine destination location or a routine destination area, respectively, for example. In other embodiments, a user of the mobile interactive services system 200 may indicate to the system that a trip is a routine trip.

The controller module 210 can be configured to communicate data to other components of the mobile interactive services system 200. For example, the controller module 210 can communicate user input data, such as interactive data, to the modem module 220. Moreover, the controller module 210 can be configured to control at least a portion of the operation of other components of the mobile interactive services system 200. The controller module 210 can control, for example, the providing of video, audio, and/or other data to the passenger device modules $240_0, \ldots, 240_N$.

The modem module 220 can be configured to communicate with a network such as the hybrid satellite/terrestrial communication network 100 described in FIG. 1. In this regard, the modem module 220 can support multiple wireless and/or satellite communication or networking protocols, including multiple cellular communication protocols, for example. For mobile video services, for example, the modem module 220 can support one or more satellite communication protocols, such as digital video broadcasting satellite services to handhelds (DVB-SH) or DVB second generation (DVB-S2). The modem module 220 can communicate with cellular networks such as global system for mobile communications (GSM) or code-division multiple access (CDMA) networks, for example. Moreover, the modem module 220 can be configured to support wireless side-loading operations, such as content loading from a local area network (LAN), through multiple wireless interfaces, including WiMax IEEE 802.16 interface and/or WiFi IEEE 802.11 interface, for example.

The media server module 230 can be configured to store multimedia data (e.g., video, audio, navigation, and/or travel assistance data). The multimedia data can be stored in, for example, integrated circuit (IC) memory, compact discs (CDs), digital video discs (DVDs), and other like machine-readable storage medium. In some instances, the media server module 230 can receive multimedia data for storage from the modem module 220. In this regard, the media server module 230 can operate as a digital video recorder (DVR), for example. In a DVR, multimedia data (e.g., current satellite video channel programming) can be received and stored while stored multimedia data (e.g., previously stored satellite video channel programming) can be accessed for further processing. The media server module 230 can communicate stored multimedia data to the controller module 210, which may process and/or display the multimedia data. For instance, the controller module 210 can display video data, audio data, instructional information, travel assistance information, navigation maps, guidance information, travel directions, information related to specified destinations and/or destinations within destination or assistance categories, personal and/or community ratings of places, and/or other information that may be stored in the media server module 230. Moreover, the controller module 210 may communicate at least a portion of the multimedia data received from the media server module 230 to one or more of the passenger device modules $240_0, \ldots, 240_N$ for display.

The passenger device modules $240_0, \ldots, 240_N$ can be configured to process and/or display data received from the controller module 210. For example the passenger device modules $240_0, \ldots, 240_N$ can be configured to play movies, music, radio programming, video games, and/or other applications. The controller module 210 can be used to select which application is provided in each of the passenger device modules. In this regard, the passenger device modules $240_0, \ldots, 240_N$ can be configured such that each can provide the same application (e.g., multiple users can play a single video game) or different applications (e.g., different movies in each module).

Other embodiments of the mobile interactive services system 200 can include architectural organizations, such as data and/or control bus architectures, for example, different from those of the different embodiments described in FIG. 2. In other embodiments, more than one of the modules described in FIG. 2 can be combined into a single module. One or more of the functionalities or operations provided by different modules described in FIG. 2 can be shared between different modules and/or can be combined such that a single module provides the functionality or operation. Other embodiments of the mobile interactive services system 300 can include one or more modules that can support additional mobile interactive satellite services.

FIG. 3 depicts a schematic representation of a mobile interactive services system 300 that can be configured to provide mobile interactive satellite services such as mobile interactive navigation services and/or mobile interactive travel assistance services, for example. The mobile interactive services system 300 can include one or more radio frequency (RF) front-end modules $302_0, \ldots, 302_M$, one or more baseband processing modules $304_0, \ldots, 304_M$, a memory module 306, a multimedia processing module 308, a processing module 312, an interface module 314, a media server module 310, a display module 318, an audio module 320, and/or an input/output (I/O) module 322. In some embodiments, the mobile interactive services system 300 can include one or more passenger device modules $316_0, \ldots, 316_N$. The media server module 310 and the passenger device modules $316_0, \ldots, 316_N$ in FIG. 3 can have, respectively, substantially similar functionality as that of the media server module 230 and of the passenger device modules $240_0, \ldots, 240_N$ described in FIG. 2.

The RF front-end modules $302_0, \ldots, 302_M$ can be coupled to one or more antennas, such as the antennas $301_0, \ldots, 301_M$, for example, for transmission and/or reception of RF signals. The mobile interactive services system 300 can communicate with a hybrid satellite/terrestrial communication network through the RF front-end modules $302_0, \ldots, 302_M$ via the antennas $301_0, \ldots, 301_M$. Each of the antennas $301_0, \ldots, 301_M$ can be a single antenna or multiple antennas, such as antenna arrays, for example. In some instances, the mobile interactive services system 300 can support multiple-input multiple-output (MIMO) operations, and other like operations that use antenna diversity or smart antenna technology.

The modules or components of the mobile interactive services system 300 can be software-based (e.g., set of instructions executable at a processor, software code) and/or hardware-based (e.g., circuit system, processor, application-specific integrated circuit (ASIC), field programmable gate array (FPGA)). The RF front-end modules $302_0, \ldots, 302_M$, for example, can be configured to process RF signals. In this regard, an RF front-end module can operate as a transmitter (i.e., processes signals for wireless transmission) and/or as a receiver (i.e., processes wirelessly-received signals). An RF front-end module can be configured to perform multiple signal processing operations, including, but not limited to, amplification, filtering, analog-to-digital conversion (ADC), de-modulation, modulation, digital-to-analog conversion (DAC), and/or mixing, for example. Thus, an RF front-end module can convert received RF signals to an appropriate baseband frequency for further processing and/or convert baseband frequency signals to appropriate RF signals for wireless transmission. An RF front-end module can process signals according to one or more terrestrial (e.g., land-based) and/or satellite RF communication protocols.

The baseband processing modules $304_0, \ldots, 304_M$ can be configured to perform digital signal processing operations on data received from an RF front-end module, from the processing module 312, and/or from the memory module 306, for example. A baseband processing module can communicate processed data to an RF front-end module for wireless transmission or to another module of the mobile interactive services system 300 for further processing. In one example, video content from a video interactive service can be received and processed by a baseband processing module and can be communicated to the multimedia processing module 308 for further processing. In another example, travel assistance or assistance-related data can be received and processed by a baseband processing module and can be communicated to the processing module 312 for further processing and/or to the memory module 306 for storage. A baseband processing module can process data according to one or more terrestrial and/or satellite RF communication protocols. Moreover, a baseband processing module can provide feedback information to an RF front-end module based on information that results from processing data.

The memory module 306 can include a machine-readable storage medium, such as an IC memory, for example, that can be configured to store data used by the mobile interactive services system 300. In some instances, the stored data can include data related to one or more mobile interactive satellite services such as navigation services and/or travel assistance services. For example, the memory module 306 can store travel assistance and/or assistance-related data that can include, without limitation, historical trip data, current trip data, navigation data provided by a service provider that is related to a previously conducted trip, navigation data related to a assistance service provider, and/or data related to multiple assistance service providers for a specified assistance category. The memory module 306 can be configured to store other types of data including, without limitation, data related to terrestrial and/or satellite communication protocols, data related to terrestrial and/or satellite communication activity, video data, audio data, and/or application data. The memory module 306 can store data received from and/or to be communicated to a hybrid satellite/terrestrial communication network through the RF front-end modules $302_0, \ldots, 302_M$.

The multimedia processing module 308 can be configured to digitally process multimedia data (e.g., video, audio, and/or content data). For example, video data can be decoded and/or encoded at the multimedia processing module 308 according to the appropriate video coding standard. In this regard, the multimedia processing module 308 can be configured to support more than one video, audio, and/or content data coding standard, such as the H.264 standard and/or the MPEG-4 standard for video coding, for example. In some instances, the processing module 312 can provide at least a portion of the multimedia data processing operations supported by the mobile interactive services system 300. For example, the multimedia processing module 308 can be optimized for video data processing operations and the processing module 312 can be used to provide audio and/or content data processing operations.

The processing module 312 can be configured to provide operations for mobile interactive satellite services, including mobile interactive navigation services and/or mobile interactive travel assistance services. For example, along with providing control operations for the mobile interactive services system 300, the processing module 312 can provide mobile interactive navigation services operations that include, but are not limited to, operations related to the processing, storing, displaying, organizing, selecting, and/or inputting of user data. In this regard, the processing module 312 can receive data from a hybrid satellite/terrestrial communication network through the RF front-end modules $302_0, \ldots, 302_M$ and the baseband processing modules $304_0, \ldots, 304_M$. Moreover, the processing module 312 can receive data from the memory module 306, the multimedia processing module 308, the display module 318, media server module 310, the audio module 320, the I/O module 322, and/or the passenger device modules $316_0, \ldots, 316_N$.

The interface module 314 can be configured to communicate data between multiple modules and the processing module 312. In some embodiments, the interface module 314 can support multiple interface busses, protocols, and/or standards, such as the inter-integrated circuit ($I^2C$) bus, the integrated inter-chip sound ($I^2S$) bus, the serial-peripheral interface (SPI) bus, and/or the universal serial bus (USB), for example. In this regard, the interface module 314 can use different bus protocols to communicate, for example, audio, video, content, and/or graphical data between the processing module 312 and one or more modules. For example, in mobile interactive travel assistance services, a controller module, such as the controller 210 in FIG. 2, can include the display module 318, the audio module 320, and/or the I/O module 322 for providing a user interface (UI) to receive and/or provide travel assistance data. In this example, the display module 318 can communicate with the interface module 314 through one interface protocol and the audio module 320 through a different interface protocol. Moreover, the I/O module 322 can communicate user selection data, such as touch-screen data input or button data input, for example, using yet a different interface protocol.

Other embodiments of the mobile interactive services system 300 can include architectural organizations, such as data and/or control bus architectures, for example, different from those of the different embodiments described in FIG. 3. In other embodiments, more than one of the modules described in FIG. 3 can be combined into a single module. One or more of the functionalities or operations provided by different modules described in FIG. 3 can be shared between different modules and/or can be combined such that a single module provides the functionality or operation. Other embodiments of the mobile interactive services system 300 can include one or more modules that can support additional mobile interactive satellite services.

Figure 4B:
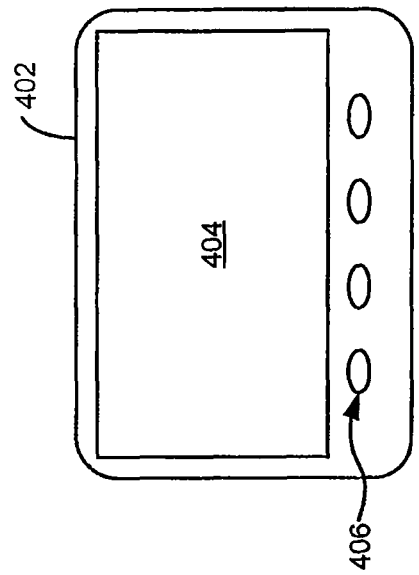
FIGS. 4A-4B are front views of controllers and passenger devices for use with a hybrid satellite and terrestrial communication network, according to embodiments of the invention.
Figure 4A:
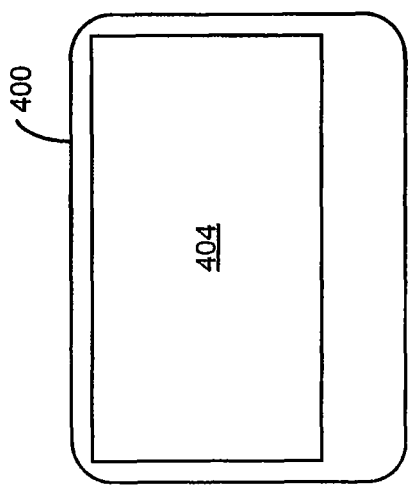

FIGS. 4A-4B are front views of controllers and passenger devices for use with a hybrid satellite and terrestrial communication network, according to embodiments of the invention. FIG. 4A shows a front view of a module 400, which can be a controller module or a passenger device module as described in FIGS. 2 and 3, for example. The module 400 can include a display screen 404 that can be configured to graphically represent or display data, including data related to mobile interactive satellite services such as navigation services and/or travel assistance services, for example. In some embodiments, the display screen 404 can be a touch-screen display, for example, which can be used to enter data, such as alphanumeric data and/or selection data. The data entered through a touch-screen display can be subsequently processed by a mobile interactive services system to provide appropriate operations for mobile interactive satellite services. In some instances, certain operations and/or selections can be activated by touching an icon or other graphical or visual representation displayed on the screen. In other instances, certain operations and/or selections can be activated by gesturing and/or writing on the touch-screen display.

FIG. 4B depicts a front view of a module 402 that can include the display screen 404. Along with the display screen 404, the module 402 can include one or more controls 406 (e.g., buttons) that can be used to enter data, such as alphanumeric data and/or selection data. For example, one or more of the controls 406 can be used as soft buttons that provide a different set of selection options. In another example, one or more of the controls 406 can be used as hard buttons that provide a fixed set of selection options, such as setting the module to an ON or OFF state. The controllers or passenger devices described in FIGS. 4A-4B can detect selections made by a user through the user interface provided by the display screen 404 and/or the controls 406.

The modules 400 and 402 can include audio and/or visual components (not shown) that can be used to input and/or output data. In one example, a speaker (not shown) can be included to provide a user with audio navigation instructions or with audio travel assistance instructions. In another example, a microphone (not shown) can be used to provide a mobile interactive services system with spoken selections or spoken input data, such as speaking an assistance category or speaking a current location or address. In yet another example, a camera (not shown) can be included to detect user motions, gestures, and/or signals that can correspond to a data entry operation.

As described above, controllers in a mobile interactive services system can be used to provide a user interface for mobile interactive satellite services that can be supported through a network such as the hybrid satellite/terrestrial communication network 100. Travel assistance services, for example, can use the interactive aspect of the hybrid satellite/terrestrial communication network 100 to offer users a wide geographic coverage and a more flexible, effective, and/or feature-rich travel assistance experience.

Figure 5:
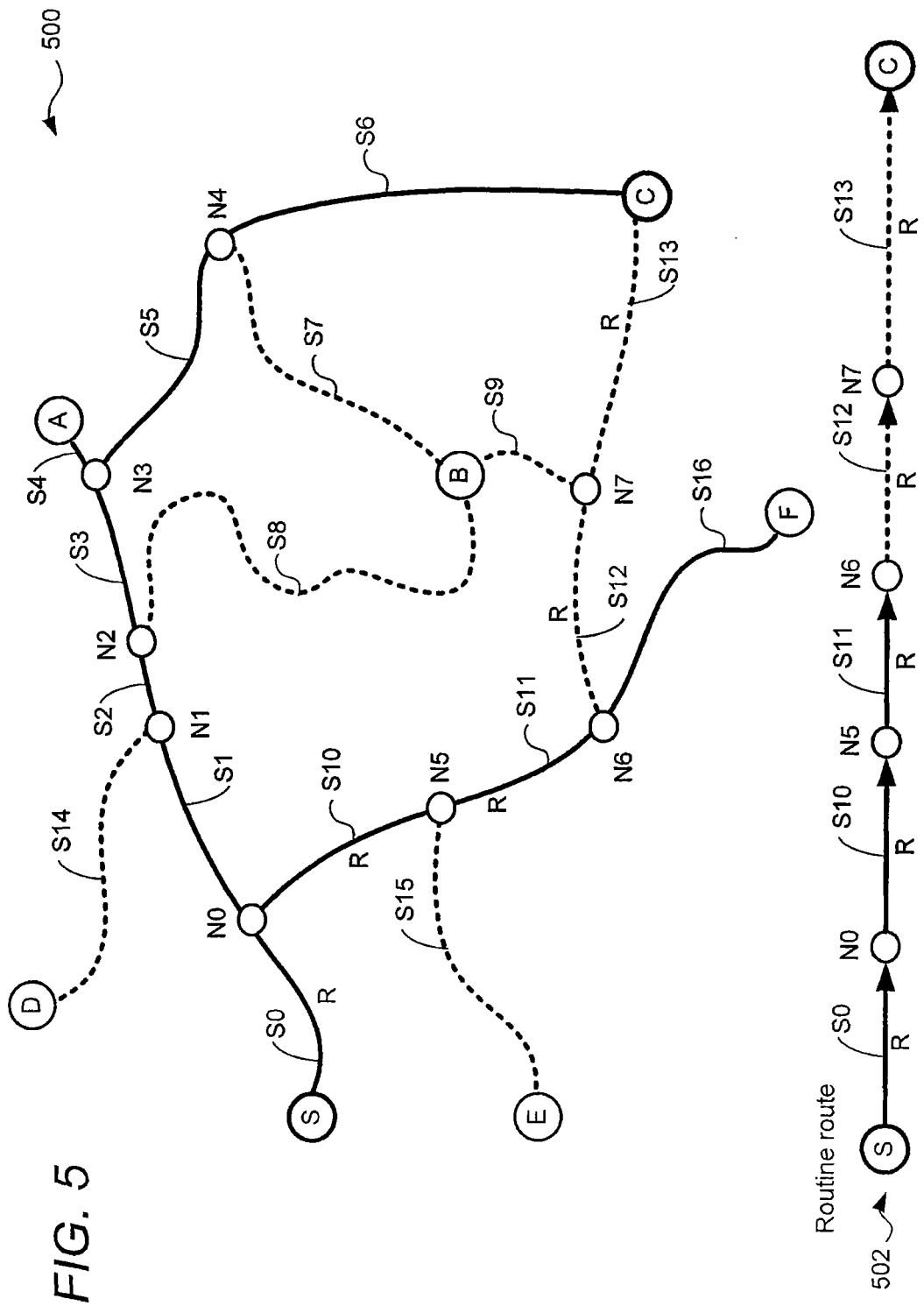
FIG. 5 is a schematic representation of a navigation map including routine trip data, according to an embodiment of the invention.

FIG. 5 is a schematic representation of a navigation map, including routine trip data, according to an embodiment of the invention. As shown in FIG. 5, a navigation map 500 can be a graphical representation of a geographic area or region that includes information regarding multiple locations (e.g., towns, cities, places, landmarks, addresses) and/or road information (e.g., road identification, road lanes, exit identification, road intersections and junctions, speed limits). The geographic region in the navigation map 500 can correspond to a region for which mobile interactive satellite services can be provided. In this regard, the navigation map 500 can include information that can be used by a mobile interactive travel assistance service to determine and/or provide travel assistance instructions and/or other assistance-related data.

In the example shown in FIG. 5, the navigation map 500 can include multiple locations S, A, B, C, D, E, and F, multiple road or route segments, and/or multiple road or route nodes. A route segment can refer to a road or to a portion of a road between two route nodes, for example. As shown, a solid-line route segment can be associated with a large road, such as a highway, for example, and a dotted-line route segment can be associated with a local road, such as a back road or a rural road, for example. In this regard, a solid-line route segment can generally correspond to a route segment in which a driver can travel at a faster speed than when traveling through a dotted-line route segment. For example, local roads tend to have fewer lanes of traffic and have more traffic lights, both of which may tend to reduce the average travel speed. A route node can refer to an intersection or junction between two or more route segments, for example. In some instances (not shown), a route node can also refer to a location or landmark in a route segment that need not be associated with a road intersection or junction.

Within the geographic area described by the navigation map 500, multiple different trips can occur. For example, for a trip between location S and location A, route segments S0, S1, S2, S3, and S4 and nodes N0, N1, N2, and N3 may be traversed. In another example, for a trip between location S and location B, route segments S0, S1, S2, and S8 and nodes N0, N1, and N2 may be traversed. Traveling between location S and location C, for example, may involve traversing route segments S0, S10, S11, S12, and S13 and nodes N0, N5, N6, and N7. In yet another example, traveling between location A and location F may involve traversing route segments S4, S5, S6, S13, S12, and S16 and nodes N3, N4, location C, N7, and N6.

In some instances, there may be more than one possible route for a trip that involves going from a first location to a second location. For example, a first route for a trip starting at location S and having as destination location B can include traversing route segments S0, S1, S2, and S8 and nodes N0, N1, and N2. A second route for a trip starting at location S and having as destination location B can include traversing route segments S0, S10, S11, S12, and S9 and nodes N0, N5, N6, and N7, for example. The first and second routes can differ in multiple aspects, including total travel distance, travel time, average travel speed, route segments and/or nodes traversed, travel areas or neighborhoods, ease or comfort in traveling (e.g., highway traffic or local road traffic), and/or costs (e.g., tolls), for example.

Differences in routes for a particular trip can result in a user of a mobile interactive services system (e.g., a driver or vehicle passenger) having a preference for one route over another route. In this regard, the user may routinely or regularly prefer to travel using a particular route for trips between specified locations. An example of a regularly occurring trip can be going from the user's home to their place of work at the beginning of a work day. Another example of a regularly occurring trip can be the return trip home at the end of the work day. In this regard, the user or driver can have a preference for one of multiple possible routes that may be available when traveling to and from work, for example.

A regularly occurring trip can be referred to as a routine trip and the route segments traversed during the routine trip can be referred to as routine route segments, for example. As described above, a mobile interactive navigation system can be used to collect historical trip data which can be processed to determine whether a trip occurs with a sufficient degree of regularity to be a routine trip. Historical trip information that can be processed to determine whether a trip is a routine trip can include, but need not be limited to, starting and destination locations, departure time, arrival time, and/or day of travel (e.g., Monday, weekday, weekend). In some instances, the mobile interactive navigation system can process the historical trip data while in other instances the historical trip data can be communicated to a provider of navigation and/or travel assistance services for processing. In the example shown in FIG. 5, a routine trip 502 can include traveling from a location S to a destination at location C. The routine trip 502 can include a route that traverses route segments S0, S10, S11, S12, and S12 and nodes N0, N5, N6, and N7. In this example, an "R" can be used to label routine route segments associated with the routine trip 502.

In some instances, a user may prefer to use routine route segments when making a trip that is different from the routine trip 502. In the example shown in FIG. 5, to travel from location S to a destination at location B, a user can select between, for example, a first route that includes traversing route segments S0, S1, S2, and S8 and route nodes N0, N1, and N2, and a second route that includes traversing route segments S0, S10, S11, S12, and S9 and route nodes N0, N5, N6, and N7. In this instance, the user or driver may prefer the second route over the first route because it includes routine route segments S0, S10, S11, and S12 with which the user may be more comfortable and/or familiar, for example.

Routine route segments can be temporally defined, that is, can be associated with a specific time of day and/or with specific days. In some instances, a route segment can be a routine route segment for a first trip but may not be a routine route segment for a second trip because of the time and/or day in which the second trip is occurring.

Figure 6A:
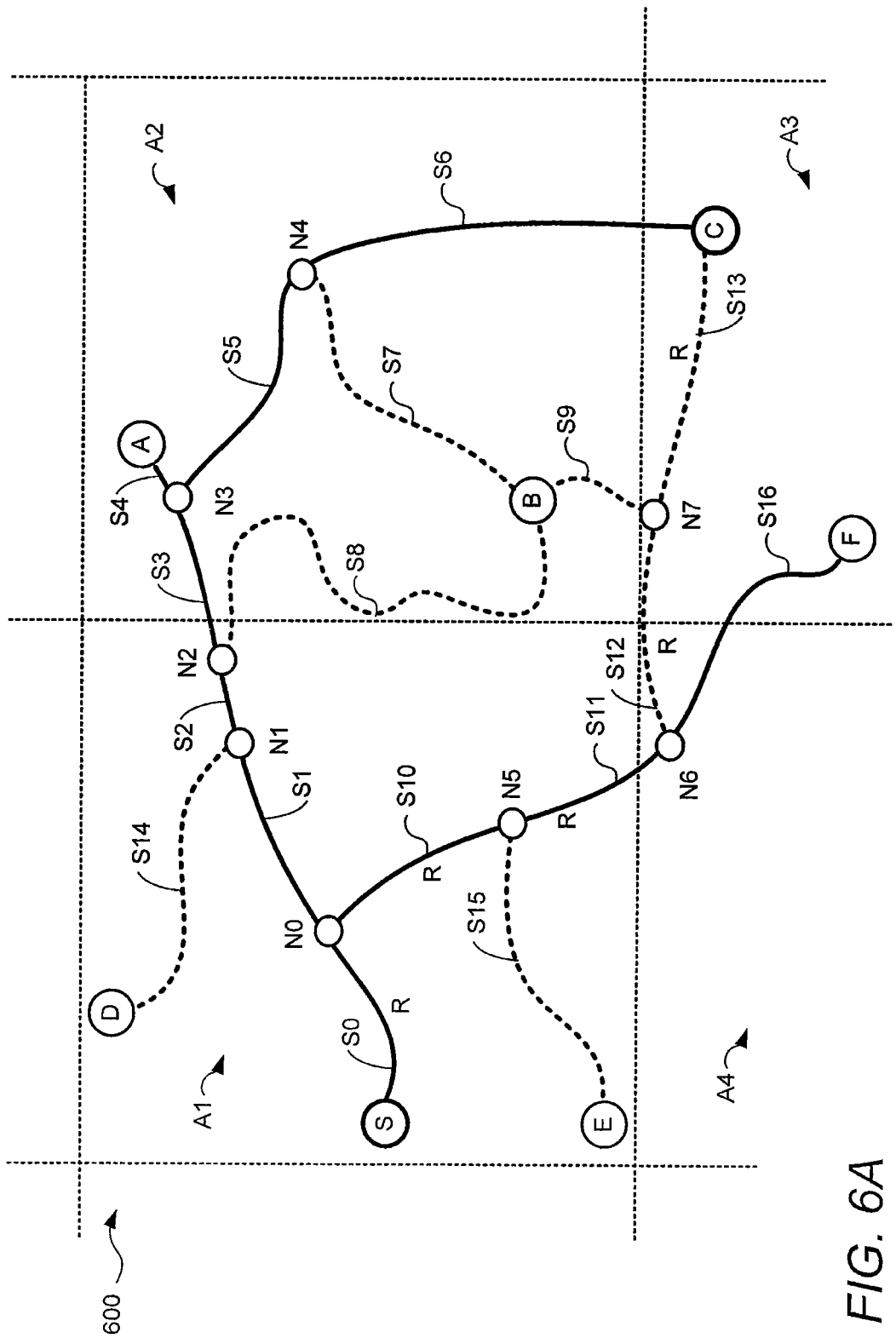
FIG. 6A is a schematic representation of a navigation map including defined areas, according to an embodiment of the invention.

FIG. 6A is a schematic representation of a navigation map including defined areas, according to an embodiment of the invention. FIG. 6A depicts a navigation map 600 that includes the location information and road information described in FIG. 5. Also shown are multiple areas A1, A2, A3, and A4. The areas A1, A2, A3, and A4 can each have a specified or defined geographic area, however, they need not have similar areas, shapes, contours, and/or outlines. In other embodiments, the areas can have different areas, shapes, contours, and/or outlines from those described in FIG. 6A. Moreover, other embodiments can include a different number of areas than the number used in the example in FIG. 6A. Each of the locations S, A, B, C, D, E, and F can be located within one of the areas A1, A2, A3, and A4, for example. For example, locations S, D, and E can be located within area A1. In another example, locations C and F can be located within area A3. In some instances, such as when a location is at a boundary or interface between areas, the location may be included within more than one of the areas A1, A2, A3, and A4.

A starting area can refer to an area or region in which the starting point of a trip is located, for example. Similarly, a destination area can refer to an area or region in which the destination of a trip is located, for example. For instance, when traveling from location S to location A, a user of a mobile interactive services system can start at location S in area A1 and can arrive at location A in area A2. In this example, area A1 is the starting area and area A2 is the destination area. When traveling between any two locations in the navigation map 600 in FIG. 6A, a user or driver may travel from one area to another area or may travel within one of the areas (i.e., the starting and destination areas can be the same).

A user of a mobile interactive services system may routinely or regularly prefer to travel to a specific destination area. For example, the user's place of work, preferred supermarket, and preferred shopping mall may all be located in area A3. A regularly occurring destination area can be referred to as a routine destination area, for example. As described above, a mobile interactive navigation system can be used to collect historical trip data which can be processed to determine whether a particular destination area occurs with a sufficient degree of regularity to be a routine destination area.

Destination areas can be temporally defined, that is, can be associated with a specific time of day and/or with specific days. In some instances, a destination area can be a routine destination area for a first trip but may not be a routine destination area for a second trip because of the time and/or day in which the second trip is occurring.

Figure 6B:
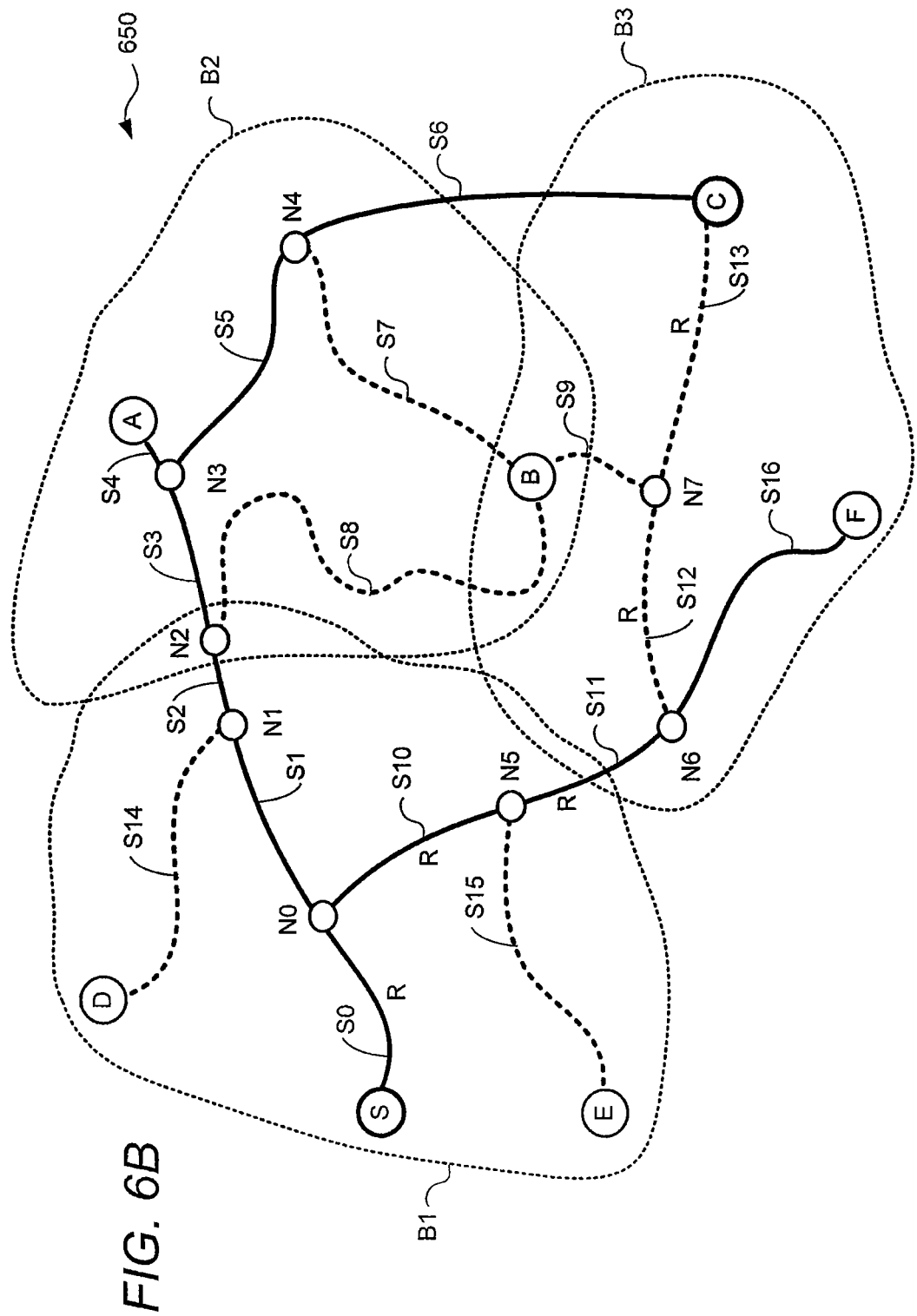
FIG. 6B is a schematic representation of a navigation map including dynamic areas, according to an embodiment of the invention.

FIG. 6B is a schematic representation of a navigation map including dynamic destination areas, according to an embodiment of the invention. FIG. 6B depicts a navigation map 650 that includes the location information and road information described in FIGS. 5 and 6A. Also shown are multiple areas B1, B2, and B3, which can each be dynamically specified or defined based on, for example, historical trip data. For instance, the area, contour, shape, and/or size of each of the areas B1, B2, and B3 can be adjusted or modified based on statistical information that can result from the processing of historical trip data. Areas B1, B2, and B3 can, in some instances, overlap such that a location in the navigation map 650 can be included in more than one of areas B1, B2, and B3. Moreover, as areas B1, B2, and B3 can dynamically change, whether a location is included within a specified area can vary over time.

For example, the home of a user of a mobile interactive services system can be in location S and the user may take short trips, such as for local grocery shopping, for example, to locations D and E. Thus, the geographic scope of area B1 may be at least partially determined from historical trip data collected from trips between the user's home and local shopping at locations D and E. Changes in the user's local shopping habits can result in changes to area B1. In another example, the user's place of work can be in location C. The user may generally stop at locations B and F (e.g., gas station, coffee shop) when traveling to and/or from work. Thus, the geographic scope of area B3 may be determined at least partially from historical trip data collected from trips to and/or from work. Changes in the user's travel habits to work (e.g., dropping off and/or picking up a child at daycare near location A) can result in changes to area B1.

As described above, a user of a mobile interactive services system may routinely or regularly prefer to travel to a specific destination area. For example, area B3 can be a routine destination area when the user travels to area B3 as a destination area with a sufficient degree of regularity. In this regard, the user can have a preference for route segments located within a routine destination area when making a trip. For example, when traveling from location S in area B1 to location B in areas B2 and B3, the user can select between, for example, a first route that includes route segments S0, S1, S2, and S8 and route nodes N0, N1, and N2, and a second route that includes route segments S0, S10, S11, S12, and S9 and route nodes N0, N5, N6, and N7. In this instance, the user can have a preference for the second route because it includes more route segments (e.g., S11, S12, and S9) associated with routine destination area B3 than the first route (e.g., S8).

In some instances, the user's travel preferences, including routine route segments and/or routine destination areas, for example, can be used to provide and/or adjust travel assistance instructions or data provided by a travel assistance service provider. For example, upon requesting travel assistance (e.g., requesting auto repair assistance, medical care assistance) through a mobile interactive services system, a user may receive navigation data and/or other data related to one or more assistance providers. The user may select or accept one from multiple available assistance providers based on, for example, preferences in the routes to and/or from the assistance providers. For example, when traveling to receive medical care, a user can prefer a medical care facility for which the route to the facility uses routine route segments and/or the medical care facility is located in a routine destination area. In another example, when requesting auto repair service, a user can prefer an auto repair shop for which an assistance vehicle dispatched by the auto repair shop would use routine route segments in reaching the place where assistance is desirable and/or the auto repair shop is located in a routine destination area.

Figure 7:
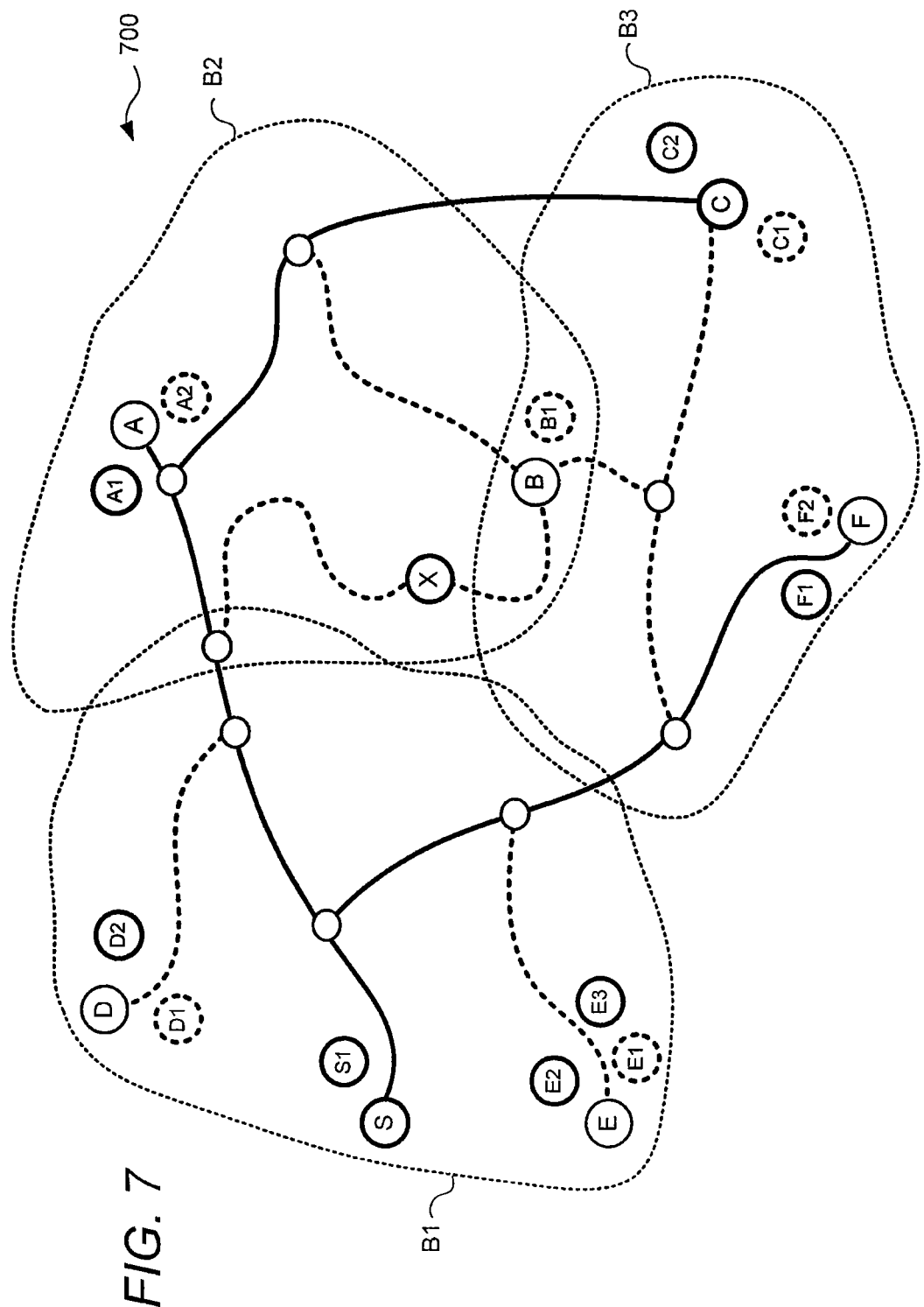
FIG. 7 is a schematic representation of navigation data including location of assistance request and of multiple assistance providers, according to an embodiment of the invention.

FIG. 7 is a schematic representation of navigation data including location of the assistance request and of multiple assistance providers, according to an embodiment of the invention. FIG. 7 depicts a navigation map 700 that includes the location information, road information, and area information described in FIG. 6B. Also shown are multiple assistance service providers (e.g., auto repair shops, gas stations, police stations, medical centers) that can be associated with an assistance category. For medical assistance requests, for example, the assistance providers illustrated in FIG. 7 can include police stations and/or medical centers. In another example, for auto repair assistance the assistance providers in FIG. 7 can include auto repair shops.

In the example shown in FIG. 7, the assistance providers can be located near one of the locations S, A, B, C, D, E, and F. For instance, the assistance provider S1 is shown near location S and assistance providers A1 and A2 are shown near location A. Other assistance providers also shown in the example in FIG. 7 include B1, C1, C2, D1, D2, E1, E2, E3, F1, and F2. In some instances, one or more assistance providers may be recommended (e.g., highly or positively rated) by a community-of-interest (COI) to which the user belongs and/or participates. In this example, COI-recommended assistance providers are shown in solid lines and those not recommended by a COI are shown in dotted lines. The user can, for example, have a preference to use or select an assistance provider that is recommended by a COI. Also shown in the navigation map 700 is a location X that can correspond to the location of the vehicle or person that requested the assistance. In some instances, location X can correspond to the current location of the vehicle or person that requested assistance, which can be different from the location at which the assistance request took place.

The request for assistance can result from the user's own perception or experience (e.g., flat tire, ill passenger, low oil light on in dashboard) or from an automated event (e.g., vehicle diagnostics system activates request for assistance) that engages the mobile interactive services system to contact a travel assistance service. In one embodiment, the travel assistance service can provide the user with data related to one or more assistance providers that correspond to the desired assistance such that the user can select a preferred assistance provider. In another embodiment, the travel assistance service can provide a service center with which the user can communicate to make the assistance request. The service center can subsequently provide the user with data related to an assistance provider. In some instances, the user may accept the assistance provider suggested by the service center. In other instances, the user may prefer a different assistance provider than the one suggested based on, for example, the user's own prior experience with the originally suggested assistance provider.

In some embodiments, at least a portion of the data related to the assistance providers (e.g., navigation data, name of place, location, scope of services provided) can be graphically represented in the mobile interactive services system to assist the user in the selection process. In this regard, data related to the assistance providers can be graphically represented to indicate a relative preference between multiple assistance providers based on, for example, travel preferences and/or COI recommendations.

Figure 8:
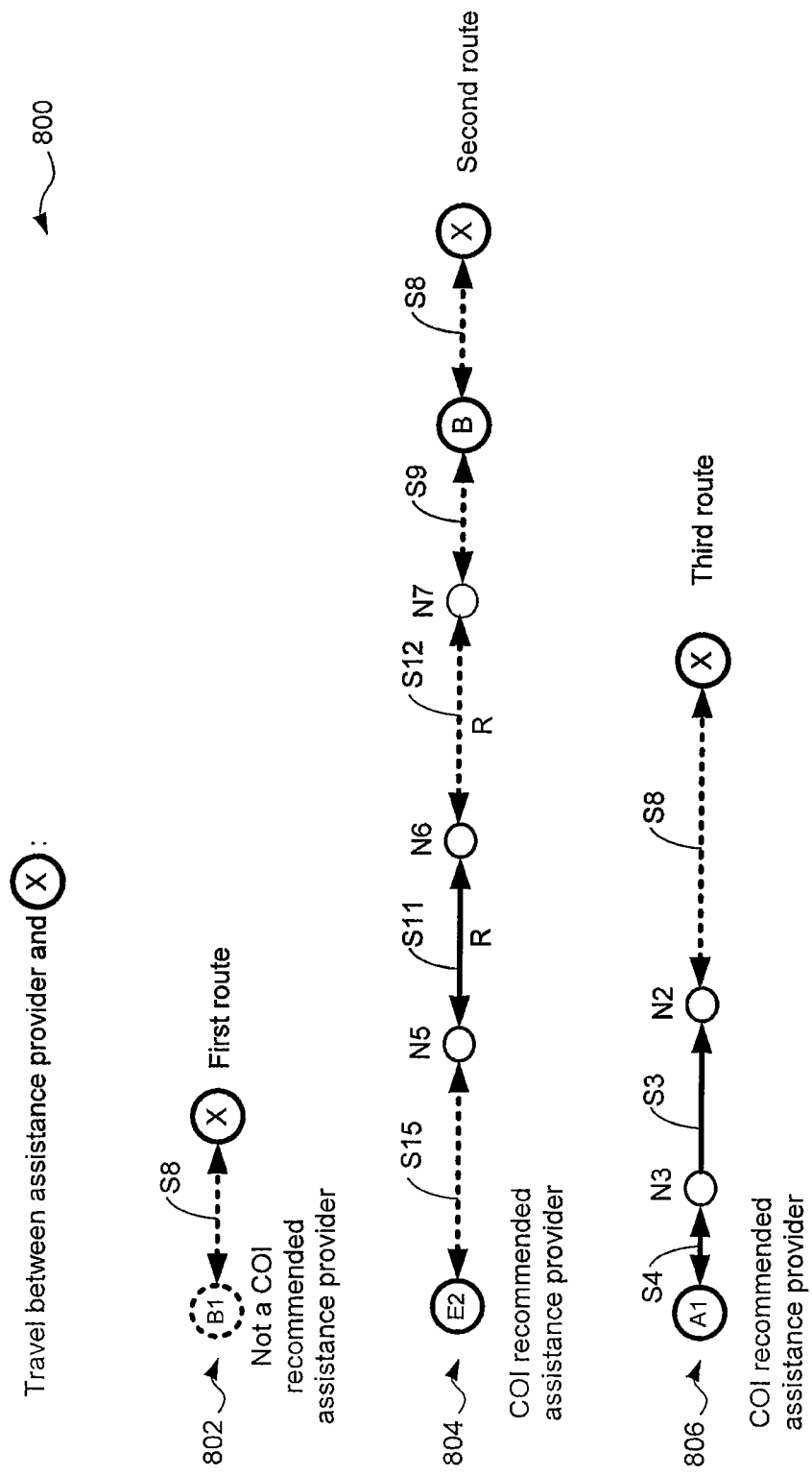
FIG. 8 is a schematic representation of navigation data related to the multiple assistance providers, according to an embodiment of the invention.

FIG. 8 is a schematic representation of navigation data related to the multiple assistance providers, according to an embodiment of the invention. Shown in FIG. 8 is a travel diagram 800 that includes information related to multiple travel or navigation routes between different assistance providers and location X as described in FIG. 7. In some embodiments, a mobile interactive services system, such as the mobile interactive services systems 200 and 300 in FIGS. 2 and 3, respectively, can be used to collect, process, operate, display, and/or select data such as the navigation data illustrated in FIG. 8. The travel diagram 800 can have data that is based on collected and/or processed historical trip data, including route segment information (e.g. routine route segments) and/or travel area information (e.g., routine destination area). In some embodiments, at least a portion of the navigation data shown in FIG. 8 can be received from a travel assistance service through a hybrid satellite/terrestrial mobile communication network.

The example illustrated by the travel diagram 800 includes a first route 802 between location X and assistance provider B1, a second route 804 between location X and assistance provider E2, and a third route 806 between location X and assistance provider A1. Other examples can illustrate travel routes for a trip between locations X and other assistance providers different from those shown in FIG. 8. The first route 802 can correspond to, for example, a route resulting in the least amount of travel time and the shortest travel distance. In this regard, assistance can reach location X or can be sought from B1 in the shortest amount of time, for example. The first route 802 can include a portion of route segment S8, which is not a routine route segment (R). In this example, the assistance provider B1 is not recommended (e.g., not highly rated, negative reviews, not covered) by a community or group of interest to the user.

The second route 804 can correspond to, for example, a travel route resulting in the multiple routine route segments being used. The second route 804 can include route segments S15, S11, S12, S9, and S8, of which route segments S11 and S12 are routine route segments (R). The second route 804 can result in the longest travel distance and/or the most travel time. In this regard, assistance can reach location X or can be sought from B1 in the most amount of time, for example, when compared to the first route 802 and the third route 806. For the second route 804, the assistance provider E2 is recommended (e.g., highly rated, positive reviews, covered) by a community or group of interest to the user.

The third route 806 can correspond to, for example, a travel route that can include route segments S4, S3, and S8, none of which is a routine route segment (R). The third route 806 can result in neither the longest or shortest travel distance nor the most or least travel time. For the third route 806, the assistance provider A1 is recommended (e.g., highly rated, positive reviews, covered) by a community or group of interest to the user.

In the example illustrated by the travel diagram 800, when determining an assistance provider, a user of a mobile interactive services system can have a preference for, for example, the fastest travel route, the shortest travel route distance, the travel route with the most routine route segments, the travel route to a routine destination area, and/or a combination of the above. Based on these preferences, the user may select the navigation data of one of the assistance providers in the travel diagram 800. For example, the user can prefer the second route 806 because it includes a large number of routine route segments and because assistance provider E2 is recommended by a COI. Routine route segments and positive ratings or reviews may give the user a level of comfort, ease, and/or familiarity from previous experiences (e.g., previous trips) that can overcome, in some instances, the benefits of faster travel times and shorter travel distances provided by the first route 802 and the third route 806, respectively.

A user's preferences can be included in the navigation data to and from an assistance provider that is provided by a travel assistance service through a mobile interactive services system. In some embodiments, the mobile interactive services system can process the user's preferences to generate at least a portion of the navigation data illustrated by the travel diagram 800. In other embodiments, a travel assistance service can process the user's preferences and communicate navigation data that is based on these preferences to the mobile interactive services system through a hybrid satellite/terrestrial communication network.

The processing of a user's preferences can include providing a weight, ranking, and/or priority to multiple aspects of a trip to and/or from an assistance provider such as, but need not limited to, travel time, travel distance, starting and/or destination location, destination area information, route segment information, traffic conditions, time of day, day of travel, and/or COI rating. The weighted aspects of the trip can be combined to determine a criterion that can be used to select one of the assistance providers that are possible for a particular assistance request. In one example, the combination can be a linear combination while in another example the combination can be non-linear. In one embodiment, the criterion can be used to graphically represent a relative preference between multiple assistance providers for user selection.

In another embodiment, at least one criterion can be used by a travel assistance service operated through a mobile interactive services system to determine a preferred assistance provider. For example, when a user connects with a service center to obtain travel assistance, the service center operator may provide the user with a preferred assistance provider. The navigation data of the preferred assistance provider can be made available (e.g., graphically represented or displayed on a display screen) to the user through a mobile interactive services system. In some embodiments, routine route segments, routine destination areas, and/or COI ratings or reviews may be given significant weight when determining the criterion from which to select an assistance provider.

Figure 9A:
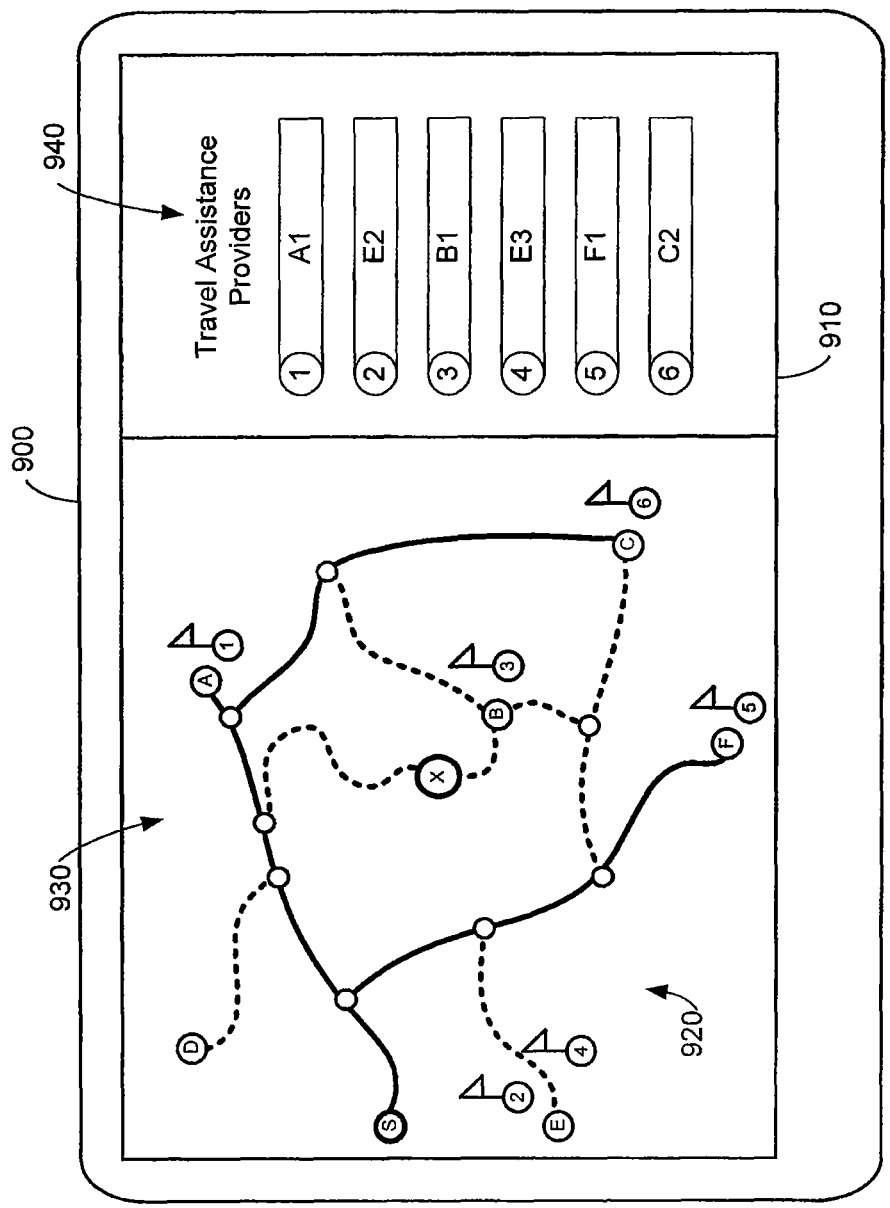
FIG. 9A is a front view of a controller that can graphically display data related to assistance providers, according to an embodiment of the invention.

FIG. 9A is a front view of a controller that can graphically display data related to assistance providers, according to an embodiment of the invention. As shown in FIG. 9A, a mobile interactive services system can include a controller 900 having a display screen 910. In some embodiments, the controller 900 can include at least a portion of the functionality provided by the controller module 210 described in FIG. 2. The display screen 910 can have a first portion 930 and a second portion 940. In other embodiments, the display screen 910 can include more or fewer portions than those described in FIG. 9A.

The first portion 930 of the display screen 910 can be used to graphically or visually represent information related to, for example, a navigation map 920. In the example shown in FIG. 9A, the navigation map 920 can include location information (e.g., towns, cities, addresses, names of places, landmarks) and road information as described in the examples in FIGS. 5, 6A, 6B, and 7. The navigation map 920 can include data related to assistance providers associated with a particular assistance request such as medical care assistance, for example. The assistance request can result in an assistance provider search based on the type of assistance requested. The navigation map 920 can include the location X associated with the place where assistance is desirable. A user or a vehicle diagnostic system, for example, can initiate the assistance request through the controller 900. The second portion 940 of the display screen 910 can be used to graphically or visually represent, for example, the relative organization of the assistance providers that results from considering the user's travel preferences (e.g., historical trip data) and/or community ratings or reviews. In this example, the assistance providers can be listed (e.g., numerical listing) from top to bottom in order of preference. In other embodiments, different graphical representations of assistance provider preferences can be used that may be different from those described in FIG. 9A. A user can select any one assistance provider and need not select the assistance provider with the highest relative preference. In one embodiment, the display screen 910 can be a touch screen, for example, such that a user can select one of the assistance providers through the display screen 910. In another embodiment, the controller 900 can include buttons that can be used to select an assistance provider from those graphically represented on the display screen 910.

Figure 9B:
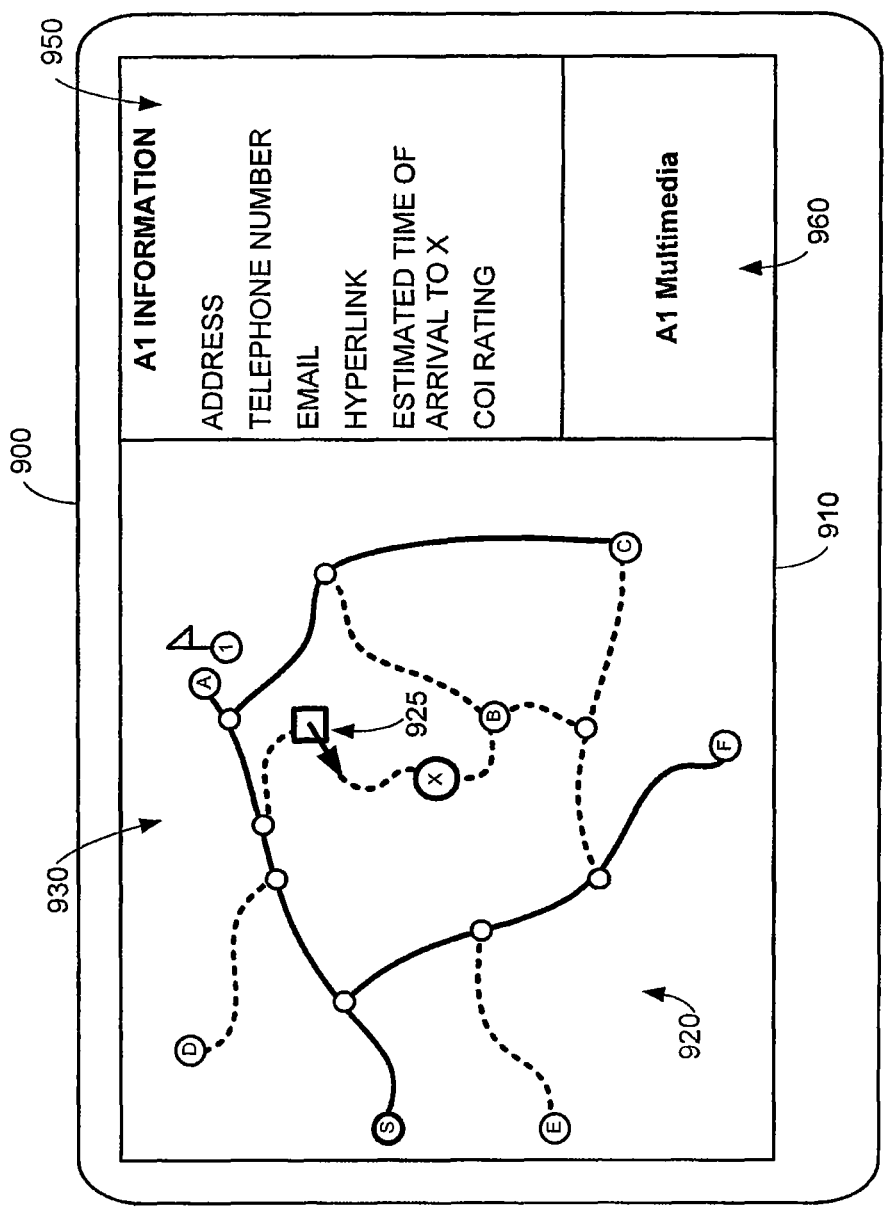
FIG. 9B is a front view of a controller that can graphically display navigation data and other data related to a dispatched assistance vehicle from a selected assistance provider, according to an embodiment of the invention.

FIG. 9B is a front view of a controller that can graphically display navigation data and other data related to a dispatched assistance vehicle from a selected assistance provider, according to an embodiment of the invention. In the example shown in FIG. 9B, the user has selected or accepted assistance provider A1 from the multiple assistance providers that resulted from the assistance category search. The display screen 910 can be used to provide navigation or guidance data and/or additional data related to the assistance provider A1. In this regard, the display screen 910 can have the first portion 930, a second portion 950, and a third portion 960. In other embodiments, the display screen 910 can include more or fewer portions than those described in FIG. 9B.

The first portion 930 of the display screen 910 can include graphically or visually represented guidance or navigation data to assist the user in tracking an assistance or service vehicle 925 dispatched from the selected assistance provider (i.e., A1 in this example). The second portion 950 of the display screen 910 can include graphically or visually represented data related to the assistance provider A1, such as, for example, an address, a telephone number, an email, a hyperlink to a website, an estimated time of arrival at location X, and/or a COI rating and/or review of assistance provider A1 when available. In some embodiments, the user can communicate with an operator at the assistance provider A1 through the mobile interactive services system. The third portion 960 of the display screen 910 can include, for example, multimedia information (e.g., advertisement, offers, commercial logos, audio content) related to the assistance provider A1.

Figure 9C:
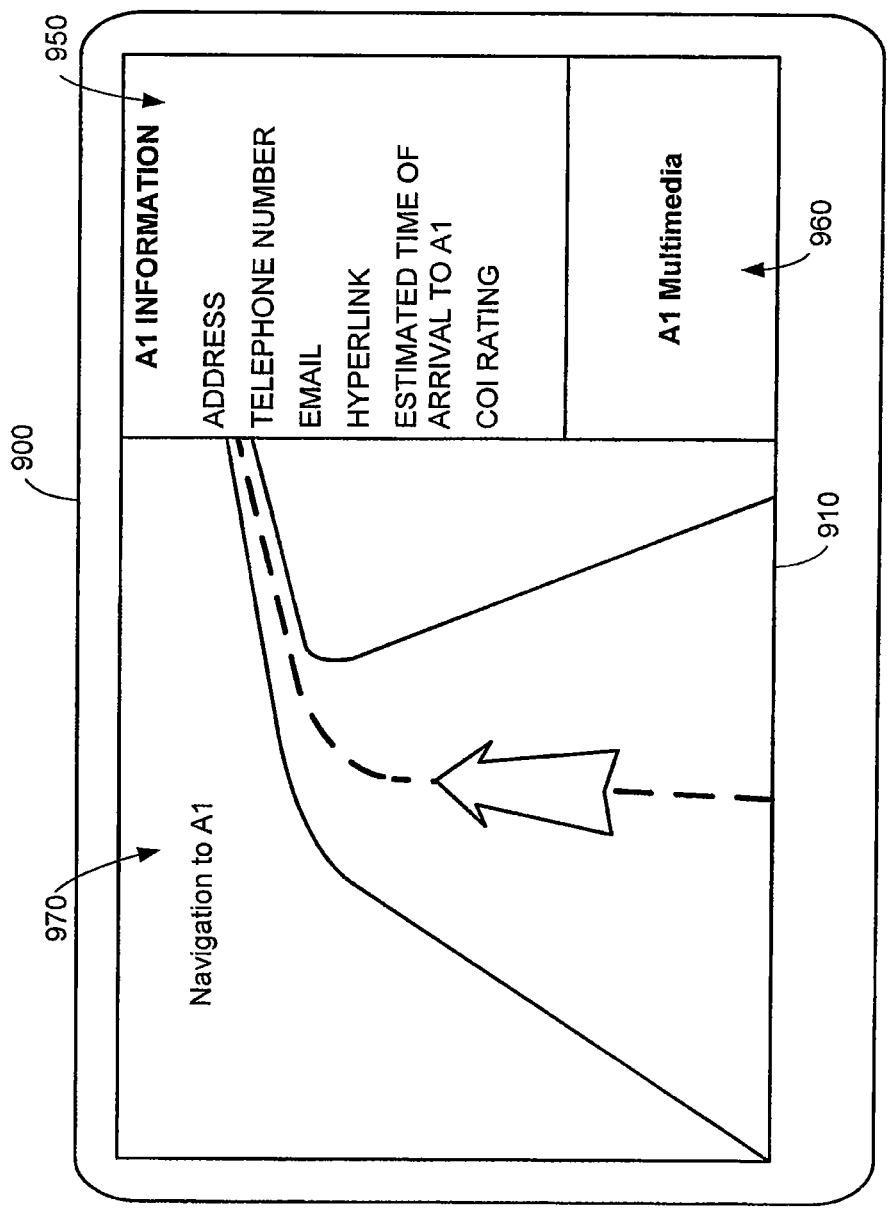
FIG. 9C is a front view of a controller that can graphically display navigation data and other data related to a selected assistance provider, according to another embodiment of the invention.

FIG. 9C is a front view of a controller that can graphically display navigation data and other data related to a selected assistance provider, according to another embodiment of the invention. In the example shown in FIG. 9C, the display screen 910 can be used to provide navigation or guidance data and/or additional data related to the selected assistance provider (i.e., assistance provider A1 in this example) such that the user can travel to the assistance provider. In this regard, the display screen 910 can have a first portion 970, the second portion 950, and the third portion 960. In other embodiments, the display screen 910 can include more or fewer portions than those described in FIG. 9C. The first portion 970 of the display screen 910 can include graphically or visually represented guidance or navigation data to assist the user in traveling from a current location X to the location of the assistance provider A1. The second portion 950 and the third portion 960 can be substantially as described in FIG. 9B.

Figure 10A:
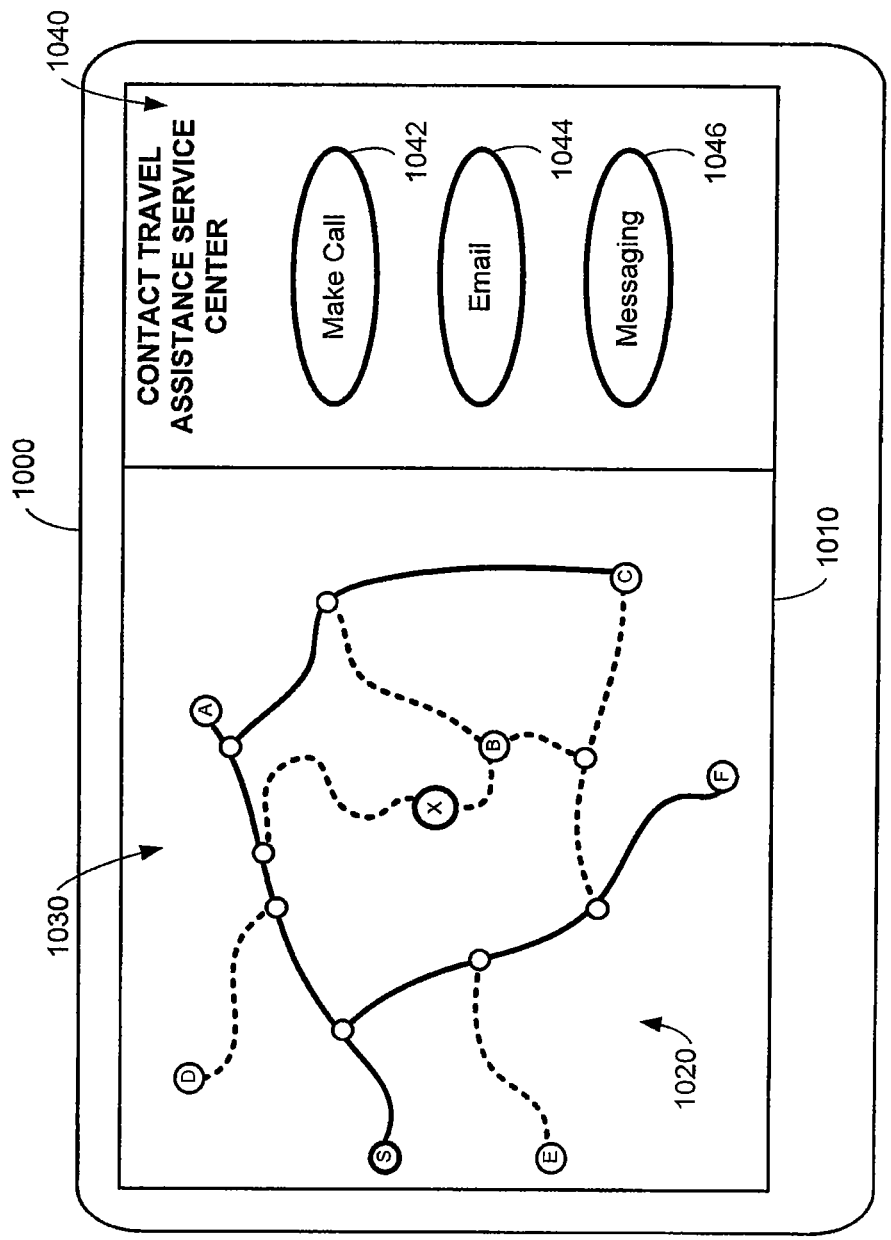
FIG. 10A is a front view of a controller that can graphically display on-screen operations for contacting a service center, according to an embodiment of the invention.

FIG. 10A is a front view of a controller that can graphically display on-screen operations for contacting a service center, according to an embodiment of the invention. As shown in FIG. 10A, a mobile interactive services system can include a controller 1000 having a display screen 1010. In some embodiments, the controller 1000 can include at least a portion of the functionality provided by the controller module 210 described in FIG. 2. The display screen 1010 can have a first portion 1030 and a second portion 1040. In other embodiments, the display screen 1010 can include more or fewer portions than those described in FIG. 10A.

The first portion 1030 of the display screen 1010 can be used to graphically or visually represent information related to, for example, a navigation map 1020. The navigation map 920 can include data related to assistance providers associated with a particular assistance request and the location X associated with the place where assistance is desirable. The second portion 1040 of the display screen 1010 can be used as a user interface to contact a service center that provides travel assistance services. In one embodiment, the display screen 1010 can be a touch screen, for example, such that a user can select a manner of communication with the service center through the display screen 1010. In this example, the second portion 1040 can include a first screen icon 1042 to access the service provider through, for example, a voice-over-IP protocol connection. The second portion 1040 can include a second screen icon 1044 to access the service provider through, for example, electronic mail. The second portion 1040 can include a third screen icon 1046 to access the service provider through, for example, text messaging. In some embodiments, fewer or more manners of communications between the user and the service center can be provided through the controller 1000. In another embodiment, the controller 1000 can include buttons that can be used to select a manner of communication between the user and the service center.

Figure 10B:
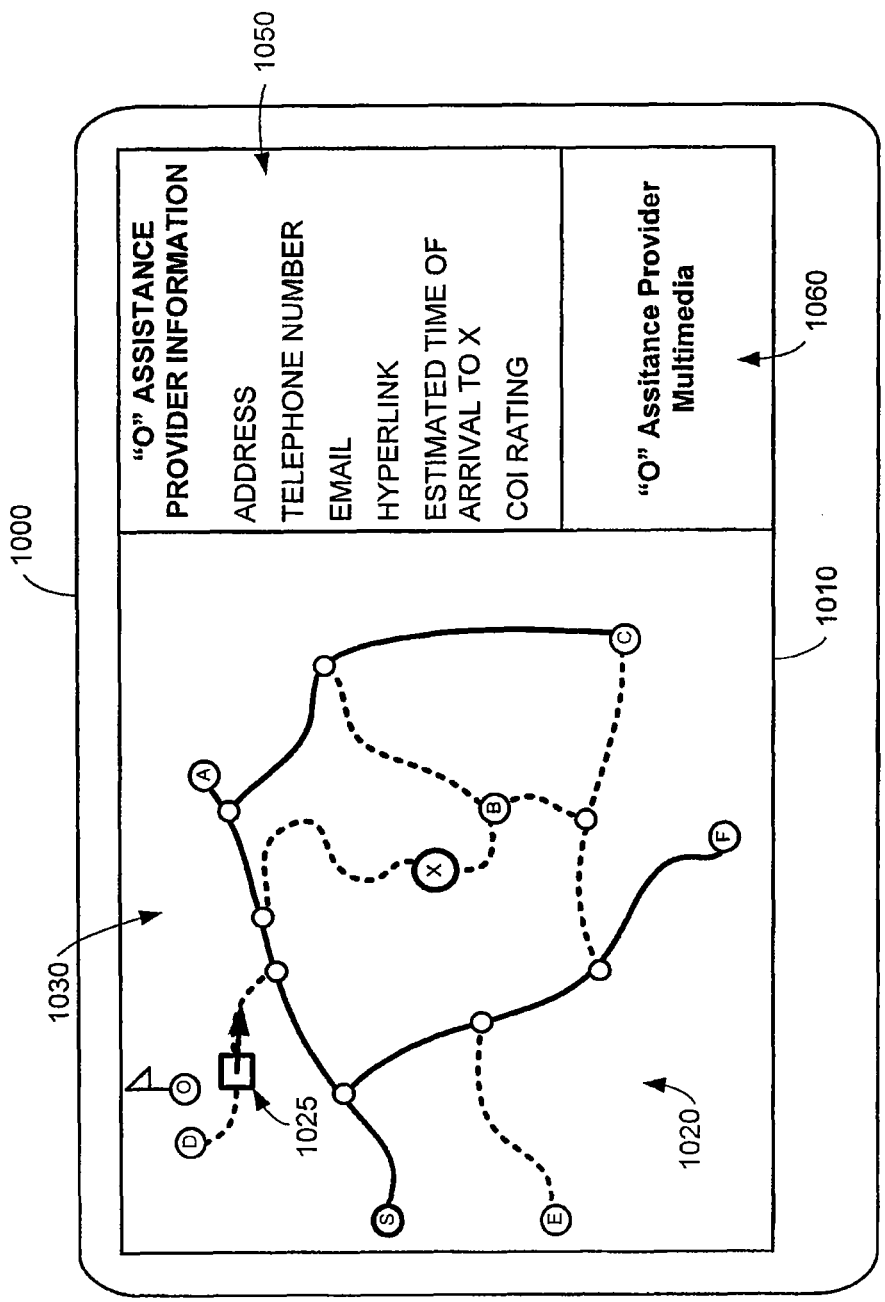
FIG. 10B is a front view of a controller that can graphically display navigation data and other data related to a dispatched assistance vehicle from an assistance provider offered by the service center, according to an embodiment of the invention.

FIG. 10B is a front view of a controller that can graphically display navigation data and other data related to a dispatched assistance vehicle from a assistance provider offered by the service center, according to an embodiment of the invention. In the example shown in FIG. 10B, the service center provides the user with assistance provider O near location D based on the assistance requested, location X, and/or user preferences (e.g., historical trip information, COI ratings). The display screen 1010 can be used to provide navigation or guidance data and/or additional data related to the assistance provider O. In this regard, the display screen 1010 can have the first portion 1030, a second portion 1050, and a third portion 1060. In other embodiments, the display screen 1010 can include more or fewer portions than those described in FIG. 9B.

The first portion 1030 of the display screen 1010 can include graphically or visually represented guidance or navigation data to assist the user in tracking an assistance or service vehicle 1025 dispatched from the assistance provider that was provided by the service center (i.e., O in this example). The second portion 1050 of the display screen 1010 can include graphically or visually represented data related to the assistance provider O, such as, for example, an address, a telephone number, an email, a hyperlink to a website, an estimated time of arrival at location X, and/or a COI rating and/or review of assistance provider O when available. In some embodiments, the user can communicate with an operator at the assistance provider O through the mobile interactive services system. The third portion 1060 of the display screen 1010 can include, for example, multimedia information (e.g., advertisement, offers, commercial logos, audio content) related to the assistance provider O.

Figure 10C:
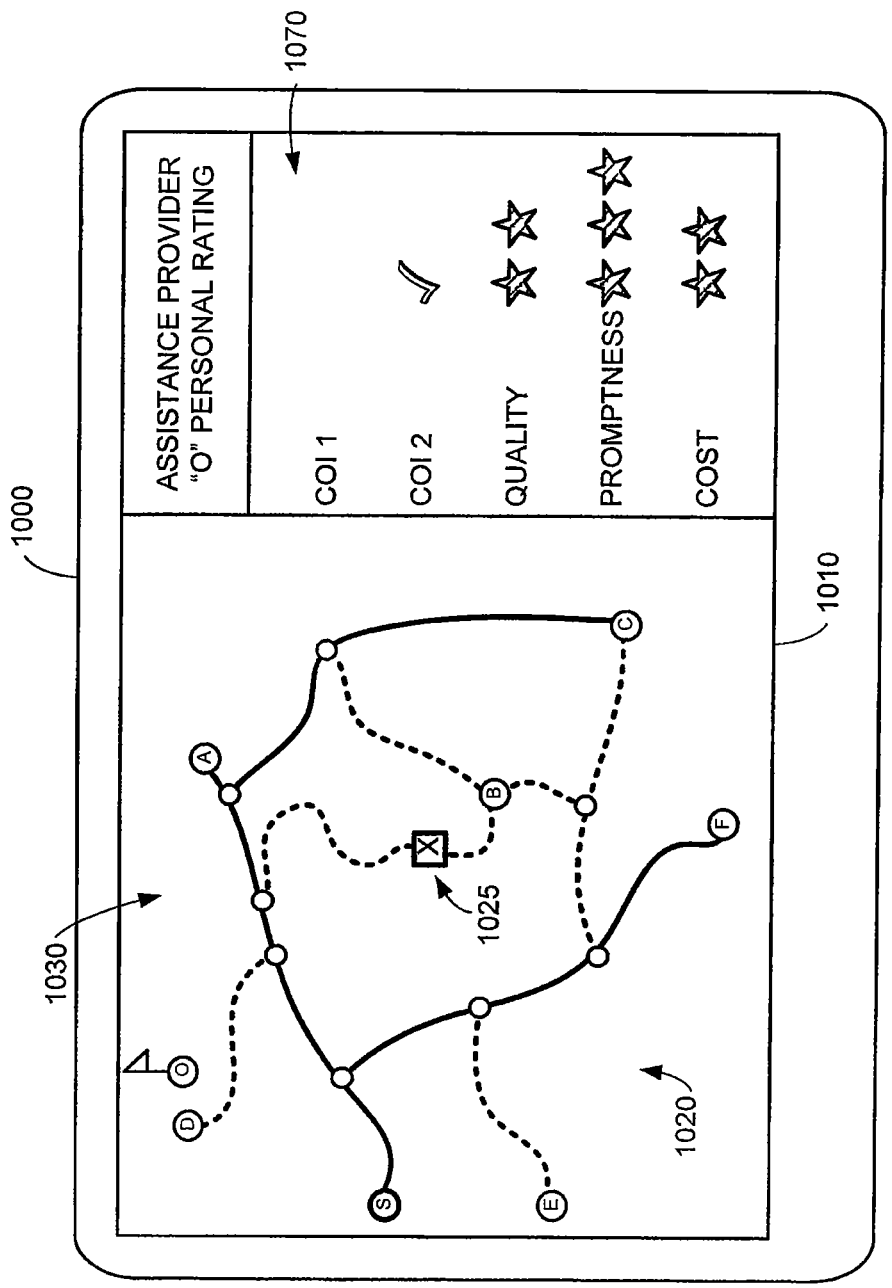
FIG. 10C is a front view of a controller that can graphically display feedback data provided to a community-of-interest related to the assistance provider, according to an embodiment of the invention.

FIG. 10C is a front view of a controller that can graphically display feedback data provided to a community-of-interest related to the assistance provider, according to an embodiment of the invention. As shown in FIG. 10C, after arriving at location X, the assistance or service vehicle 1025 can provide the appropriate assistance desirable. The display screen 1010 can graphically or visually illustrate the arrival of the assistance or service vehicle 1025 at location X. For example, in the first portion 1030 location X is shown as a square instead of a circle. The display screen 1010 can have a second portion 1070 that can be used to provide a review or rating of the service provided by the assistance provider O. The review or rating can be shared with communities or groups of interest to the user through a hybrid satellite/terrestrial communication network. The feedback of the service provided by the assistance provider O can be numerical (e.g., ranking, number of stars) and/or descriptive (e.g., poor, good, above average).

Figure 11:
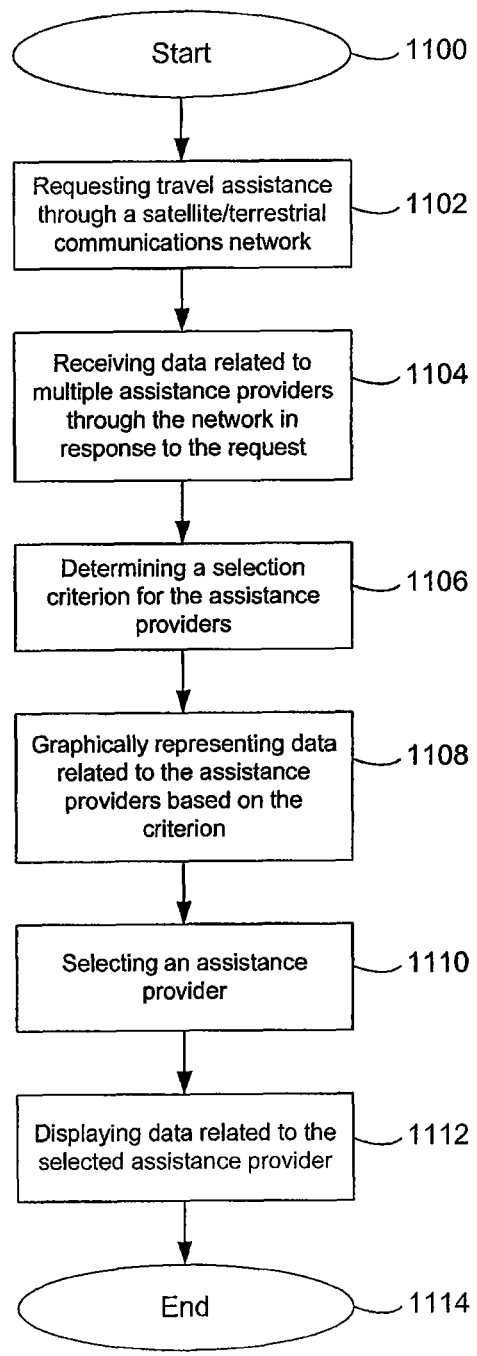
FIGS. 11-12 are flow charts illustrating a method according to an embodiment of the invention.

FIG. 11 is a flow chart illustrating a method for selecting a travel assistance service provider according to an embodiment of the invention. At 1102, after start 1100, a user can request travel assistance through a mobile interactive satellite service that supports travel assistance services. The mobile interactive satellite services can be provided through a mobile interactive services system and/or a hybrid satellite/terrestrial communication network. In some instances, the travel assistance request can result from a vehicle diagnostics system. At 1104, based on the type of assistance that is desirable, a search can be performed to provide one or more assistance providers. Data related to the assistance providers can be communicated to the mobile interactive services system through the hybrid satellite/terrestrial communication network, for example. At 1106, the mobile interactive services system can process the assistance provider data to determine at least one criterion (e.g., organizing assistance providers based on travel preferences and/or service ratings) to assist the user in the selection process.

At 1108, the mobile interactive services system can graphically represent and organize the assistance provider data based on the determined criterion or criteria. At 1110, the user can select or accept one of the assistance providers. The mobile interactive services system can detect the user selection and process the selection. At 1112, the mobile interactive services system can graphically display data related to the selected assistance provider (e.g., navigation data to and/or from the selected assistance provider, contact information) that can aid the user in obtaining and/or receiving the desired assistance. After 1112, the method can proceed to end 1114.

Figure 12:
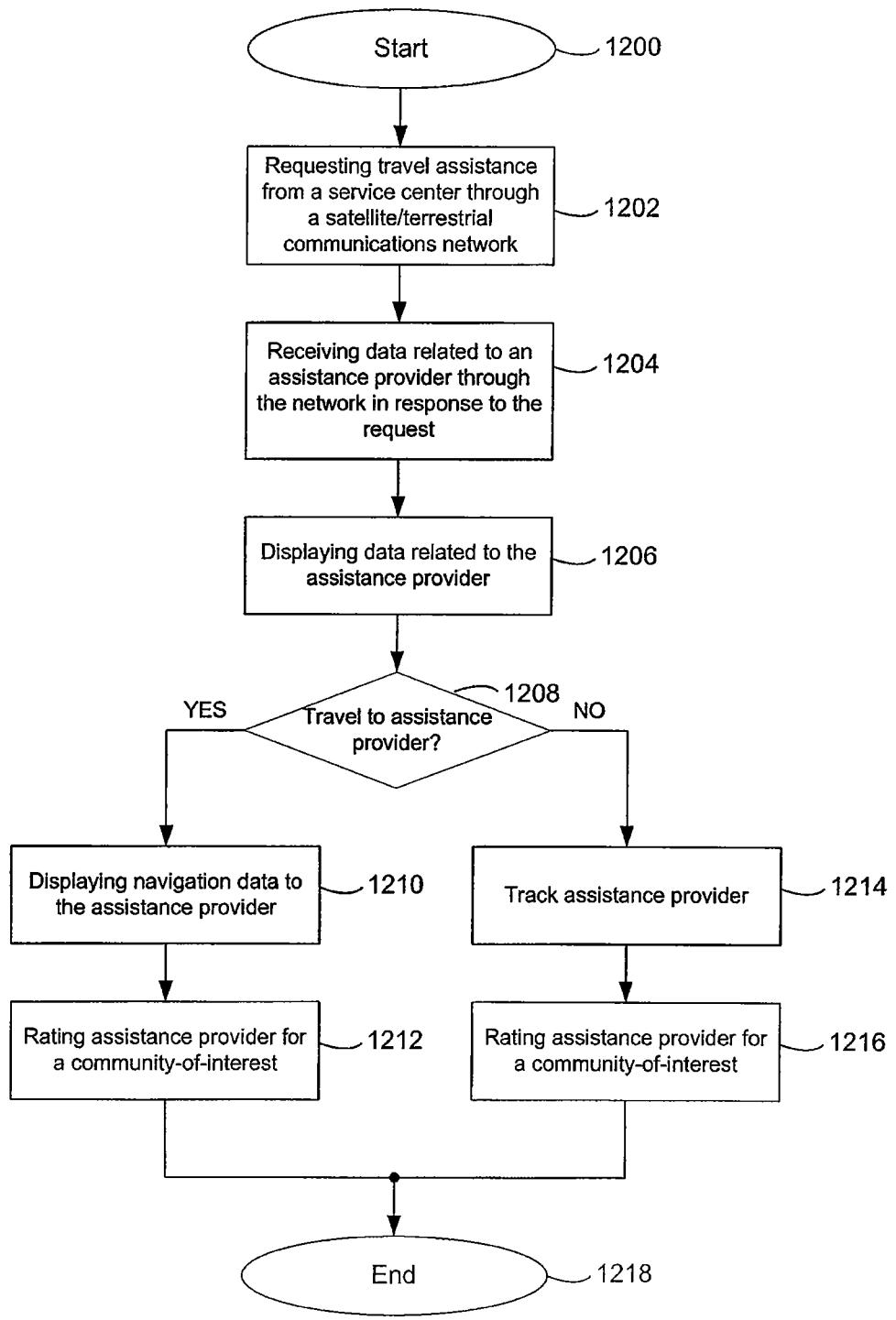

FIG. 12 is a flow chart illustrating a method for requesting travel assistance information from a service center according to an embodiment of the invention. At 1202, after start 1200, a user can request travel assistance from a service center (e.g., live operator, service center user interface) through a mobile interactive satellite service that supports travel assistance services. The mobile interactive satellite services can be provided through a mobile interactive services system and/or a hybrid satellite/terrestrial communication network. In some instances, the travel assistance request can result from a vehicle diagnostics system. At 1204, based on the type of assistance that is desirable, a search can be performed to provide an assistance provider. In this regard, when selecting an assistance provider, the travel assistance service can consider the location of where the service is to be provided, the user travel preferences, and/or ratings of possible assistance providers, for example. Data related to the assistance provider can be communicated from the service center to the user through the hybrid satellite/terrestrial communication network, for example. At 1206, the mobile interactive services system can graphically represent or display data related to the assistance provider offered by the service center.

At 1208, when the type of assistance is such that the user may prefer to travel to the assistance provider (e.g., medical care), the mobile interactive service system can at 1210 display navigation data to aid the user in reaching the assistance provider. Back at 1208, when the type of assistance is such that the user may prefer to have the assistance provider reach the user (e.g., auto breakdown), the mobile interactive service system can at 1214 display navigation data to provide tracking of a dispatched service vehicle from the assistance provider. At 1212 and 1216, after the service is rendered, the user can provide a rating or review of the assistance provider to be shared with others in certain communities or groups with common interests. After 1212 and 1216, the method can proceed to end 1218.

In some embodiments, a processor in the mobile interactive services system can be operated to process a travel assistance request for communication to a satellite and terrestrial mobile communications network. The processor can be operated to process data related to multiple assistance providers that is received from the satellite and terrestrial mobile communications network in response to the travel assistance request. For example, the processor can process at least one criterion for an assistance provider based on a distance from a location of the assistance provider to where the travel assistance is desirable and/or an estimated travel time from the location of the assistance provider to where the travel assistance is desirable. The processor can process at least one criterion for an assistance provider based on historical trip data such as route segment data and destination area data, for example, and/or a rating or review provided by a COI. A display coupled to the processor can be operated to graphically represent data related to the assistance providers, such as, one or more criteria, a telephone number, an address, a website, a hyperlink, a multimedia feed, an email address, and/or estimated travel times, for example. In some instances, the data related to the assistance providers can be graphically represented a relative preference between assistance providers. An input device coupled to the processor can be operated to detect a selection of one of the assistance providers.

In other embodiments, a processor in a mobile interactive services system can be operated to process a travel assistance request for communication to a service center through a satellite and terrestrial mobile communications network. The processor can be operated to receive data related to an assistance provider from the service center through the satellite and terrestrial mobile communication network. An input device, an output device and/or the processor can be collectively operated to communicate with an operator at the service center. A display coupled to the processor can be operated to graphically represent the data related to the assistance provider, which may include location information in a navigation map, a telephone number, an address, a website, a hyperlink, a multimedia feed, an email address, an estimated time for the dispatched assistance vehicle to arrive where the assistance is desirable, and/or an estimated time to arrive at the location of the assistance provider, for example.

In other embodiments, a processor in a mobile interactive services system can be operated to process a travel assistance request for communication to a satellite and terrestrial mobile communications network. The processor can process data related to multiple assistance providers for graphical representation. The data related to the assistance providers can be received from the satellite and terrestrial mobile communications network in response to the travel assistance request. The processor can process a selection of one of the graphically represented assistance providers.

In other embodiments, a processor in a mobile interactive services system can be operated to process a travel assistance request for communication to a service center through a satellite and terrestrial mobile communications network. The processor can receive data related to an assistance provider from the service center through the satellite and terrestrial mobile communication network. The processor can process the data related to the assistance provider for graphical representation to assist the user.

CONCLUSION

While various embodiments of the invention have been described above, it should be understood that they have been presented by way of example only, and not limitation. For example, the mobile interactive services device described herein can include various combinations and/or sub-combinations of the components and/or features of the different embodiments described. Although described with reference to use with an MSS/ATC system, it should be understood that the mobile interactive travel assistance services and the mobile interactive services device, as well as the methods of using the mobile interactive travel assistance services and the mobile interactive services device can be used with other wireless network systems.

Embodiments of a mobile interactive travel assistance service can also be provided without the mobile interactive services device described herein. For example, a mobile interactive travel assistance service can be configured to be used with other suitable controllers, vehicle consoles, handheld devices, laptop computers, etc., not specifically described herein. Data from a mobile interactive travel assistance service can be accessed, processed, displayed, and/or selected in a different manner than as illustrated and described herein. A mobile interactive travel assistance service can also be provided with other interactive features and/or services such as, for example, navigation services.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks, and read-only memory ("ROM") and random-access memory ("RAM") devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

What is claimed is:

1. A non-transitory processor-readable medium storing code representing instructions to cause a processor to:
   send a first signal associated with an assistance request to a service center via a satellite and terrestrial mobile communications network;
   receive data associated with a plurality of assistance providers in response to the assistance request;
   select, at a first time, a first preferred assistance provider from the plurality of assistance providers based at least in part on a route between a current location and the first preferred assistance provider including a routine route segment at the first time; and select, at a second time, a second preferred assistance provider from the plurality of assistance providers based at least in part on an absence of the routine route segment from the route at the second time.

2. The non-transitory processor-readable medium of claim 1, wherein the first preferred assistance provider is within a destination area, the destination area being a routine destination area during the first time, the destination area being a non-routine destination area during the second time.

3. The non-transitory processor-readable medium of claim 1, wherein the first preferred assistance provider is within a first destination area during the first time, the first destination area being a routine destination area, the first preferred assistance provider being within a second destination area during the second time, the second destination area being a non-routine destination area.

4. A non-transitory processor-readable medium storing code representing instructions to cause a processor to:
send a first signal associated with an assistance request to a service center via a satellite and terrestrial mobile communications network;
receive data associated with a plurality of assistance providers in response to the assistance request;
select, at a first time, a first preferred assistance provider from the plurality of assistance providers based at least in part on the first preferred assistance provider being located within a first destination area, the first destination area being a routine destination area at a first time, the first destination area being a non-routine destination area during a second time; and
select, at the second time, a second preferred assistance provider from the plurality of assistance providers based at least in part on the second preferred assistance provider being located within a second destination area, the second destination area being a routine destination area at the second time.

5. The non-transitory processor-readable medium of claim 4, wherein the first preferred assistance provider is located within the first destination area at the first time and the second time, the first preferred assistance provider being located without the first destination area at a third time.

6. The non-transitory processor-readable medium of claim 4, wherein the code representing instructions to cause the processor to select the first preferred assistance provider includes code representing instructions to select the first preferred assistance provider based at least in part on a number of routine route segments associated with a route between a current location and a location of the first preferred assistance provider.

* * * * *